United States Patent
Ringold et al.

(10) Patent No.: US 10,144,818 B2
(45) Date of Patent: Dec. 4, 2018

(54) RESIN COMPOSITIONS AND METHODS FOR MAKING AND USING SAME

(71) Applicant: ECOLAB USA INC., St. Paul, MN (US)

(72) Inventors: Clay E. Ringold, Decatur, GA (US); David F. Townsend, Grayson, GA (US); Cornel Hagiopol, Lilburn, GA (US); James W. Johnston, Suwanee, GA (US)

(73) Assignee: ECOLAB USA INC., St. Paul, MN (US)

( * ) Notice: Subject to any disclaimer, the term of this patent is extended or adjusted under 35 U.S.C. 154(b) by 261 days.

(21) Appl. No.: 14/884,723

(22) Filed: Oct. 15, 2015

(65) Prior Publication Data
US 2016/0115315 A1 Apr. 28, 2016

Related U.S. Application Data

(60) Provisional application No. 62/064,508, filed on Oct. 16, 2014.

(51) Int. Cl.
| | |
|---|---|
| *B05D 3/02* | (2006.01) |
| *C08L 33/26* | (2006.01) |
| *C08L 77/00* | (2006.01) |
| *C08L 79/00* | (2006.01) |
| *C08L 1/02* | (2006.01) |
| *C08L 97/02* | (2006.01) |
| *C08G 73/02* | (2006.01) |
| *C08L 79/02* | (2006.01) |
| *B32B 27/02* | (2006.01) |

(52) U.S. Cl.
CPC ............ *C08L 1/02* (2013.01); *C08G 73/0286* (2013.01); *C08G 73/0293* (2013.01); *C08L 33/26* (2013.01); *C08L 79/02* (2013.01); *C08L 97/02* (2013.01)

(58) Field of Classification Search
None
See application file for complete search history.

(56) References Cited

U.S. PATENT DOCUMENTS

| | | | |
|---|---|---|---|
| 2009/0165978 A1* | 7/2009 | Hagiopol | C08F 220/56 162/168.3 |
| 2013/0081771 A1 | 4/2013 | Luo et al. | |
| 2014/0020858 A1* | 1/2014 | Ringold | D21H 21/20 162/164.6 |

FOREIGN PATENT DOCUMENTS

WO 2014/099838 6/2014

* cited by examiner

*Primary Examiner* — Michael J Feely
(74) *Attorney, Agent, or Firm* — Edmonds & Cmaidalka, P.C.

(57) ABSTRACT

Resins compositions and methods for making and using same. The resin composition can include a glyoxalated polyacrylamide resin and a polyamide-epihalohydrin resin. The polyamide-epihalohydrin resin can include a polyamine partially crosslinked with a bridging moiety and having azetidinium ions. The bridging moiety can be derived from a functionally symmetric crosslinker. A fiber product can include a plurality of fibers and the resin composition, where the resin composition can be at least partially cured.

20 Claims, No Drawings

RESIN COMPOSITIONS AND METHODS FOR MAKING AND USING SAME

CROSS-REFERENCE TO RELATED APPLICATION

This application claims priority to U.S. Provisional Patent Application No. 62/064,508, filed on Oct. 16, 2014, which is incorporated by reference herein.

BACKGROUND

Field

Embodiments described generally relate to resin compositions. More particularly, such embodiments relate to resin compositions that can include one or more polyamide-epihalohydrin (PAE) resins and one or more glyoxylated cationic polyacrylamide (GPAm) resins and methods for making and using same.

Description of the Related Art

Paper is sheet material containing small, discrete fibers interconnected with one another. The fibers are usually formed into the sheet material on a fine screen from a dilute water suspension or slurry. Paper is typically made from cellulosic fibers; however, synthetic fibers can also be used. The wet strength of paper generally refers to the resistance of paper to rupture or disintegrate when wetted with water. Paper products made from untreated cellulosic fibers exhibit a rapid decrease in wet strength when contacted with water; and thus, are generally characterized as having a low wet strength. The wet strength of a paper product made from untreated cellulosic fibers is generally only about 5% of the dry strength of the paper product. Various methods for treating paper products have been employed to increase the wet and/or dry strength thereof. For example, strengthening resins, such as wet and/or dry strengthening resins, can be applied to the cellulose fibers of the paper products to increase the wet and/or dry strength.

The wet strengthening resins applied to the cellulose fibers of paper products can be categorized as either a "permanent" type resin or a "temporary" type resin, which can be determined by the amount of time the paper retains its wet strength after contact with or immersion in water. While the wet strength retention of a paper product is a desirable property for certain applications, paper products that utilize "permanent" type wet strengthening resins often exhibit poor resistance to rupture or degradation. For example, paper products utilizing the "permanent" type wet strengthening resins can often be degradable only under undesirably severe conditions. Further, while paper products treated with wet strengthening resins exhibit increased wet strength, the dry strength of the paper products is generally unaffected or insignificantly increased, thereby limiting their utility in applications where both wet and dry strength is desired such as for use as packaging.

There is a need, therefore, for improved resin compositions and methods for making and using same.

SUMMARY

Resins compositions and methods for making and using same are provided. In at least one specific embodiment, the resin composition can include a glyoxalated polyacrylamide resin and a polyamide-epihalohydrin resin. The polyamide-epihalohydrin resin can include a polyamine partially crosslinked with a bridging moiety and having azetidinium ions. The bridging moiety can be derived from a functionally symmetric crosslinker.

In at least one embodiment, a fiber product can include a plurality of fibers and an at least partially cured resin composition. The resin composition, prior to curing, can include a glyoxalated polyacrylamide resin and a polyamide-epihalohydrin resin. The polyamide-epihalohydrin resin can include a polyamine partially crosslinked with a bridging moiety and having azetidinium ions. The bridging moiety can be derived from a functionally symmetric crosslinker.

In at least one specific embodiment, a method for making a fiber product, can include combining a resin composition with a plurality of fibers to produce a mixture. The resin composition can include a glyoxalated polyacrylamide resin and a polyamide-epihalohydrin resin. The polyamide-epihalohydrin resin can include a polyamine partially crosslinked with a bridging moiety and having azetidinium ions. The bridging moiety can be derived from a functionally symmetric crosslinker. The method can also include at least partially curing the resin composition to produce a fiber product.

DETAILED DESCRIPTION

It has been surprisingly and unexpectedly discovered that combining one or more polyamide-epihalohydrin (PAE) resins and one or more glyoxalated cationic polyacrylamide (GPAm) resins with one another can produce a resin composition that provides a significant and unexpected increase in viscosity of the resin composition over time as compared to what was expected based on the performance characteristics of the individual resins alone. Without wishing to be bound by theory, it is believed that intermolecular interactions and/or reactions may develop or form between the PAE resin and the GPAm resin to provide these unexpected synergistic effects. Furthermore, the resin composition that includes the PAE resin and the GPAm resin can also be used to produce fiber products, e.g., a paper product, that exhibit surprising and unexpected strength, such as wet strength, dry strength, and/or repulpability over what was expected based on the performance characteristics of the individual resins alone.

The PAE resin and the GPAm resin can be mixed, blended, stirred, contacted, or otherwise combined with one another to produce the resin composition. The PAE resin and the GPAm resin can be combined with one another in any order or sequence. For example, the PAE resin can be added to the GPAm resin, the GPAm resin can be added to the PAE resin, the PAE resin and the GPAm resin can be simultaneously combined with one another, or any combination thereof. In one example, the PAE resin can be added to a mixing vessel first and the GPAm resin can be subsequently added to the mixing vessel. In another example, GPAm resin can be added to the mixing vessel first and the PAE resin can be subsequently added. In yet another example, the PAE resin and the GPAm resin can be simultaneously added to the mixing vessel. In yet another example, a first portion of the PAE resin can be added to the mixing vessel first and the GPAm resin can be subsequently added to the mixing vessel, and then a second portion of the PAE resin can be added to the mixing vessel or vice versa. The PAE resin and the GPAm resin can be combined with one another at a temperature of about 5° C. to about 90° C. or more. The PAE resin and GPAm resin can be mixed for a period of time of about 0.5 minutes to about 120 minutes or more to produce the resin composition.

The PAE resin and/or the GPAm resin can be in the form of an aqueous dispersion, suspension, or solution. As such, the resin composition can include water and can also be in the form of an aqueous dispersion, suspension, or solution. The resin composition can have solids content (PAE resin and GPAm resin solids) of about 5 wt %, about 10 wt %, about 15 wt %, or about 20 wt % to about 30 wt %, about 40 wt %, about 50 wt %, about 60 wt %, about 70 wt %, about 80 wt %, about 90 wt %, about 95 wt % or more. For example, the resin composition can be in the form of an aqueous dispersion, suspension, solution, or other mixture and can have a solids concentration of 15 wt % to about 35 wt %, about 15 wt % to about 40 wt %, about 20 wt % to about 35 wt %, about 20 wt % to about 30 wt %, about 25 wt % to about 45 wt %, about 20 wt % to about 50 wt %, about 30 wt % to about 45 wt %, or about 40 wt % to about 60 wt %.

The solids weight, solids concentration, or solids content of a dispersion, suspension, solution, or solid/liquid mixture, e.g., the resin composition, as understood by those skilled in the art, can be measured by determining the weight loss upon heating a small sample, e.g., about 5 grams to about 8 grams of the mixture, to a suitable temperature, e.g., about 105° C., and a time sufficient to remove the liquid therefrom. By measuring the weight of the sample before and after heating, the percent solids in the sample can be directly calculated or otherwise estimated.

The resin composition can have a first or initial viscosity at the time the resin composition is produced by combining the PAE resin and the GPAm resin with one another. The first or initial viscosity of the resin composition at the time the resin composition is produced can be about 50 cP, about 55 cP, about 60 cP, about 65 cP, or about 70 cP to about 75 cP, about 80 cP, about 85 cP, about 90 cP, about 95 cP, about 100 cP, or more than about 100 cP, at a temperature of about 25° C. For example, the initial viscosity of the resin composition at the time the resin composition is prepared can be about 50 cP to about 120 cP, about 60 cP to about 90 cP, about 75 cP to about 105 cP, about 60 cP to about 80 cP, or about 55 cP to about 110 cP, at a temperature of about 25° C. In another example, the first or initial viscosity of the resin composition at the time the resin composition is produced can be about 50 cP, about 55 cP, about 60 cP, about 65 cP, or about 70 cP to about 75 cP, about 80 cP, about 85 cP, about 90 cP, about 95 cP, about 100 cP, or more than about 100 cP at a solids content of about 25 wt % and at a temperature of about 25° C.

The viscosity of the PAE resin, the GPAm resin, the resin composition, and/or any other compound or composition discussed and described herein can be determined using a viscometer at a temperature of about 25° C. For example, a Brookfield Viscometer, Model DV-II+, with a small sample adapter with, for example, a number 31 spindle, can be used. The small sample adapter can allow the sample to be cooled or heated by the chamber jacket to maintain the temperature of the sample surrounding the spindle at a temperature of about 25° C.

The resin composition can also have a second viscosity at a given point in time after resin composition is prepared. The second viscosity can be greater than the first or initial viscosity. For example, the viscosity of the resin composition at a time of about 5 minutes after preparing the resin composition can be about 30%, about 35%, about 40%, about 45%, about 50%, about 55%, about 60%, about 65%, about 70%, about 75%, about 80%, about 85%, about 90%, about 95%, about 100%, or more than about 100% greater than the viscosity of resin composition at the time the resin composition was produced by combining the PAE resin and the GPAm resin, where the resin composition is maintained at a temperature of about 25° C. from the time the resin composition is prepared until the second viscosity is measured. In another example, the viscosity of the resin composition at a time of about 10 minutes after preparing the resin composition can be about 45%, about 50%, about 55%, about 60%, about 70%, about 80%, about 90%, about 100%, about 110%, about 120%, about 130%, about 140%, about 150%, about 160%, or more than about 160% greater than the viscosity of resin composition at the time the resin composition was produced by combining the PAE resin and the GPAm resin, where the resin composition is maintained at a temperature of about 25° C. from the time the resin composition is prepared until the second viscosity is measured. In another example, the viscosity of the resin composition at a time of about 15 minutes after preparing the resin composition can be about 50%, about 60%, about 70%, about 80%, about 90%, about 100%, about 115%, about 130%, about 145%, about 160%, about 185%, about 200%, about 215%, about 230%, or more than about 230% greater than the viscosity of resin composition at the time the resin composition was produced by combining the PAE resin and the GPAm resin, where the resin composition is maintained at a temperature of about 25° C. from the time the resin composition is prepared until the second viscosity is measured. In another example, the viscosity of the resin composition at a time of about 20 minutes after preparing the resin composition can be about 60%, about 80%, about 90%, about 100%, about 115%, about 130%, about 145%, about 160%, about 185%, about 200%, about 215%, about 230%, about 245%, about 260%, about 275%, or more than about 275% greater than the viscosity of resin composition at the time the resin composition was produced by combining the PAE resin and the GPAm resin, where the resin composition is maintained at a temperature of about 25° C. from the time the resin composition is prepared until the second viscosity is measured. In another example, the viscosity of the resin composition at a time of about 25 minutes after preparing the resin composition can be about 70%, about 90%, about 100%, about 115%, about 130%, about 145%, about 160%, about 185%, about 200%, about 215%, about 230%, about 245%, about 260%, about 275%, about 290%, about 305%, about 320%, about 335%, or more than about 335% greater than the viscosity of resin composition at the time the resin composition was produced by combining the PAE resin and the GPAm resin, where the resin composition is maintained at a temperature of about 25° C. from the time the resin composition is prepared until the second viscosity is measured. In another example, the viscosity of the resin composition at a time of about 30 minutes after preparing the resin composition can be about 80%, about 90%, about 100%, about 115%, about 140%, about 160%, about 180%, about 200%, about 225%, about 250%, about 275%, about 300%, about 325%, about 350%, about 375%, about 400%, about 425%, about 450%, or more than about 450% greater than the viscosity of resin composition at the time the resin composition was produced by combining the PAE resin and the GPAm resin, where the resin composition is maintained at a temperature of about 25° C. from the time the resin composition is prepared until the second viscosity is measured.

The viscosity of the resin composition at a time of about 5 minutes after preparing the resin composition can be about 30%, about 35%, about 40%, about 45%, about 50%, about 55%, about 60%, about 65%, about 70%, about 75%, about 80%, about 85%, about 90%, about 95%, about 100%, or more than about 100% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured. In another example, the viscosity of the resin composition at a time of about 10 minutes after preparing the resin composition can be about 45%, about 50%, about 55%, about 60%, about 70%, about 80%, about 90%, about 100%, about 110%, about 120%, about 130%, about 140%, about 150%, about 160%, or more than about 160% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured. In another example, the viscosity of the resin composition at a time of about 15 minutes after preparing the resin composition can be about 50%, about 60%, about 70%, about 80%, about 90%, about 100%, about 115%, about 130%, about 145%, about 160%, about 185%, about 200%, about 215%, about 230%, or more than about 230% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured. In another example, the viscosity of the resin composition at a time of about 20 minutes after preparing the resin composition can be about 60%, about 80%, about 90%, about 100%, about 115%, about 130%, about 145%, about 160%, about 185%, about 200%, about 215%, about 230%, about 245%, about 260%, about 275%, or more than about 275% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured. In another example, the viscosity of the resin composition at a time of about 25 minutes after preparing the resin composition can be about 70%, about 90%, about 100%, about 115%, about 130%, about 145%, about 160%, about 185%, about 200%, about 215%, about 230%, about 245%, about 260%, about 275%, about 290%, about 305%, about 320%, about 335%, or more than about 335% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured. In another example, the viscosity of the resin composition at a time of about 30 minutes after preparing the resin composition can be about 80%, about 90%, about 100%, about 115%, about 140%, about 160%, about 180%, about 200%, about 225%, about 250%, about 275%, about 300%, about 325%, about 350%, about 375%, about 400%, about 425%, about 450%, or more than about 450% greater than the viscosity of resin composition at the time the resin composition was produced by combining the PAE resin and the GPAm resin, where the resin composition has a solids content of about 25 wt % and is maintained at a temperature of about 25° C. from the time the resin composition is prepared until the second viscosity is measured.

The resin composition can include the PAE resin in an amount of about 1 wt %, about 2 wt %, about 3 wt %, about 5 wt %, about 10 wt %, about 15 wt %, about 20 wt %, about 25 wt %, about 30 wt %, about 33 wt %, about 35 wt %, about 37 wt %, about 40 wt %, about 43 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, about 98 wt %, or about 99 wt %, based on the combined solids weight of the PAE resin and the GPAm resin. For example, the resin composition can include the PAE resin in an amount of about 5 wt % to about 95 wt %, about 10 wt % to about 90 wt %, about 15 wt % to about 80 wt %, about 20 wt % to about 70 wt %, about 25 wt % to about 75 wt %, about 30 wt % to about 60 wt %, about 40 wt % to about 50 wt %, about 30 wt % to about 40 wt %, about 25 wt % to about 35 wt %, about 12 wt % to about 20 wt %, about 13 wt % to about 18 wt %, about 35 wt % to about 45 wt %, about 45 wt % to about 55 wt %, about 55 wt % to about 65 wt %, about 63 wt % to about 70 wt %, about 75 wt % to about 85 wt %, about 85 wt % to about 95 wt %, about 60 wt % to about 80 wt %, or about 66 wt % to about 85 wt %, based on the combined solids weight of the PAE resin and the GPAm resin.

The resin composition can include the GPAm resin in an amount of about 1 wt %, about 2 wt %, about 3 wt %, about 5 wt %, about 10 wt %, about 15 wt %, about 20 wt %, about 25 wt %, about 30 wt %, about 33 wt %, about 35 wt %, about 37 wt %, about 40 wt %, about 43 wt %, or about 45 wt % to about 50 wt %, about 55 wt %, about 60 wt %, about 65 wt %, about 66 wt %, about 70 wt %, about 75 wt %, about 80 wt %, about 85 wt %, about 90 wt %, about 95 wt %, about 97 wt %, about 98 wt %, or about 99 wt %, based on the combined solids weight of the PAE resin and the GPAm resin. For example, the resin composition can include the GPAm resin in an amount of about 5 wt % to about 95 wt %, about 10 wt % to about 90 wt %, about 15 wt % to about 80 wt %, about 20 wt % to about 70 wt %, about 25 wt % to about 75 wt %, about 30 wt % to about 60 wt %, about 40 wt % to about 50 wt %, about 30 wt % to about 40 wt %, about 25 wt % to about 35 wt %, about 12 wt % to about 20 wt %, about 13 wt % to about 18 wt %, about 35 wt % to about 45 wt %, about 45 wt % to about 55 wt %, about 55 wt % to about 65 wt %, about 63 wt % to about 70 wt %, about 75 wt % to about 85 wt %, about 85 wt % to about 95 wt %, about 60 wt % to about 80 wt %, or about 66 wt % to about 85 wt %, based on the combined solids weight of the PAE resin and the GPAm resin.

The PAE resin can be prepared or produced using any suitable synthetic route or synthesis method. One exemplary method for making the PAE resin can include producing a partially crosslinked polyamine by reacting one or more polyamines and one or more functionally-symmetric "symmetric" crosslinkers. A halohydrin-functionalized polymer can be produced by reacting the partially crosslinked polyamine with one or more epihalohydrins. The polyamide-epihalohydrin resin or PAE resin can be produced by cyclizing the halohydrin-functionalized polymer to form azetidinium ions or moieties.

The polyamine, which can also be referred to as a polyamine prepolymer, can have the following chemical formula (A):

In the chemical formula (A), the R group can be a substituted or unsubstituted organic diyl group and w can be an integer of 1, about 10, about 20, about 40, about 50, about 100, about 200, about 500, or about 1,000 to about 2,000, about 3,000, about 5,000, or about 10,000. The organic diyl group can be any diyl including, but not limited to, a hydroxyl diyl, an amine diyl, an amide diyl, an aryl diyl, a heteroaryl diyl, or a cycloalkyl diyl. In many examples, the organic diyl group "R" can be methanediyl ($-CH_2-$), ethanediyl ($-CH_2CH_2-$), propanediyl ($-CH_2CH_2CH_2-$), butanediyl ($-CH_2(CH_2)_2CH_2-$), pentanediyl ($-CH_2(CH_2)_3CH_2-$), hexanediyl ($-CH_2(CH_2)_4CH_2-$), heptanediyl ($-CH_2(CH_2)_5CH_2-$), octanediyl ($-CH_2(CH_2)_6CH_2-$), nonanediyl ($-CH_2(CH_2)_7CH_2-$), decanediyl ($-CH_2(CH_2)_8CH_2-$), undecanediyl ($-CH_2(CH_2)_9CH_2-$), dodecanediyl ($-CH_2(CH_2)_{10}CH_2-$), hydroxyl substituted derivatives thereof, halide substituted derivatives thereof, amine substituted derivatives thereof, amide substituted derivatives thereof, aryl substituted derivatives thereof, heteroaryl substituted derivatives thereof, cycloalkyl substituted derivatives thereof, carboxylic acid derivatives thereof, isomers thereof, or any mixture thereof. For example, a hydroxyl substituted propanediyl could have the chemical formula ($-CH2CH(OH)CH2-$) or ($-CH(OH)CH2CH2-$).

If the R group in the chemical formula (A) is an alkyl group, then the R group can be an alkyl moiety that is linear (straight chain) or branched. The R group can also be a cycloalkyl, that is, a cyclic hydrocarbon moiety that can include 1 carbon atom to about 25 carbon atoms. For example, R can include 1 carbon atom, 2 carbon atoms, 4 carbon atoms, 6 carbon atoms, 8 carbon atoms, or 10 carbon atoms to about 12 carbon atoms, about 15 carbon atoms, about 20 carbon atoms, or about 25 carbon atoms. For example, the R group can include 2 carbon atoms to about 10 carbon atoms, 2 carb atoms to about 8 carbon atoms, 2 carbon atoms to about 6 carbon atoms, or 2 carbon atoms to 4 carbon atoms. In another example, the R group can be a $C_1$ moiety, a $C_2$ moiety, a $C_3$ moiety, a $C_4$ moiety, a $C_5$ moiety, a $C_6$ moiety, a $C_7$ moiety, a $C_8$ moiety, a $C_9$ moiety, a $C_{10}$ moiety, a $C_{11}$ moiety, a $C_{12}$ moiety, a $C_{13}$ moiety, a $C_{14}$ moiety, a $C_{15}$ moiety, a $C_{16}$ moiety, a $C_{17}$ moiety, a $C_{18}$ moiety, a $C_{19}$ moiety, a $C_{20}$ moiety, a $C_{21}$ moiety, a $C_{22}$ moiety, a $C_{23}$ moiety, a $C_{24}$ moiety, a $C_{25}$ moiety, a $C_{26}$ moiety, a $C_{27}$ moiety, a $C_{28}$ moiety, a $C_{29}$ moiety, a $C_{30}$ moiety.

The polyamine having the chemical formula (A) can have a weight average molecular weight of about 2,000, about 5,000, about 7,500, about 10,000, about 20,000, or about 30,000 to about 100,000, about 150,000, about 200,000, about 500,000, about 750,000, or about 1,000,000. As known by those skilled in art, the molecular weight of a resin or polymer can be determined using Gel Permeation Chromatography (GPC). A suitable GPC method can use an aqueous mobile phase, which can also serve as a solvent/diluent for the resin samples. Separation can be achieved with an Agilent PL aquagel-OH MIXED-H column calibrated with, for example, polyethylene glycols (PEGs) and polyethylene oxides (PEOs). A particular resin sample can be diluted and can be injected into a GPC system or an equivalent system, available from Waters Corporation. The data collected from the GPC system can be used to determine the weight average molecular weight from the calibration curve used in the normal manner with integration of the distribution curve. The method of determining the molecular weight of the resin samples is well understood by those skilled in the art and other configurations and reference materials can conveniently be used.

In the polyamine having the chemical formula (A), the R group can also be a poly-primary amine, such as polyvinyl amine and copolymers thereof. Examples of a poly-primary amines can include, but are not limited to, compounds having the following chemical formula (B), as well as copolymers with olefins and other unsaturated moieties:

In the chemical formula (B), n can be an integer of 1, 2, 3, or 4 to about 5, about 10, about 12, about 15, or about 20. For example, n can be an integer of 1, 2, 3, 4, 5, 6, 7, 8, 9, 10, 11, 12, 13, 14, 15, 16, 17, 18, 19, 20, 21, 22, 23, 24, or 25.

Illustrative polyamines (polyamine prepolymers) that can be used to produce the PAE resin can include, but are not limited to, polyalkylene polyamines such as polyethylenepolyamines. Illustrative polyethylenepolyamines can include, but are not limited to, diethylenetriamine (DETA), triethylenetetramine (TETA), tripropylenetetramine, aminoethyl piperazine, tetraethylenepentamine, pentaethylenehexamine, N-(2-aminoethyl)piperazine, N,N-bis(2-aminoethyl) ethylenediamine, diaminoethyl triaminoethylamine, piperazinethyl triethylenetetramine, or any mixture thereof. Other illustrative polyamines that can be used to produce the PAE resin can include, but are not limited to, ethylene diamine, methyl bis(3-aminopropyl)amine, dipropylenetriamine, bis(hexamethylene)triamine, bis-2-hydroxyethyl ethylenediamine, low molecular weight polyamidoamines, polyvinylamines, polyethyleneimine (PEI), and copolymers of vinyl amine with other unsaturated copolymerizable monomers, such as vinyl acetate and vinyl alcohol, or any mixture thereof.

Other illustrative polyamines can include polyamidoamine prepolymers. The polyamidoamine prepolymers can be produced by reacting one or more polyalkylene polyamines having at least two primary amine groups and at least one secondary amine group with one or more dicarboxylic acids. Illustrative polyamidoamine prepolymers can have the following chemical formula (C):

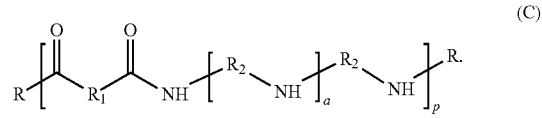

In the chemical formula (C), $R^1$ can be $(CH_2)_m$, where m can be an integer of 2, 3, 4, or 5; $R^2$ can be $(CH_2)_q$, where q can be an integer of 2, 3, or 4; a can be an integer of 1, 2, or 3; and p can be an integer of about 5, about 7, about 10, about 20, about 50, about 100, or about 500 to about 1,000, about 2,000, about 3,000, about 3,500, or about 3,800. The weight average molecular weight of the polyamidoamine prepolymer having the chemical formula (C) can be about 2,000, about 5,000, about 7,500, about 10,000, about 20,000, or about 30,000 to about 50,000, about 55,000, about 60,000, about 80,000, about 100,000, about 200,000, about 500,000, about 750,000, or about 1,000,000.

Illustrative polyamidoamine prepolymers can also have the following chemical formula (D):

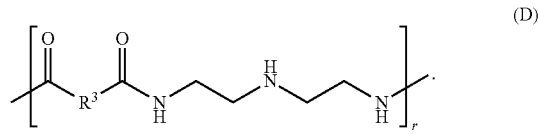

In the chemical formula (D), $R^3$ can be $(CH_2)_t$, where t can be an integer of 1, 2, 3, or 4 to about 5, about 10, about 20, about 30, or about 40; and r can be an integer of 2, 3, 4, about 5, about 10, about 20, about 50, or about 100 to about 1,000, about 2,000, about 3,000, about 4,000, about 5,500, or about 5,850. In the chemical formula (D), t can also be an integer of 1, 2, 3, 4, 5, or 6 to about 8, about 10, about 12, about 15, about 20, about 25, about 30, about 35, or about 40. The weight average molecular weight of the polyamidoamine prepolymer having formula (D) can be about 2,000, about 5,000, about 7,500, about 10,000, about 20,000, or about 30,000 to about 50,000, about 55,000, about 60,000, about 80,000, about 100,000, about 200,000, about 500,000, about 750,000, or about 1,000,000.

Illustrative polyamidoamine prepolymers can also have the following chemical formula (E):

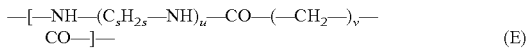

In the chemical formula (E), s can be an integer of 1 to 8; u can be an integer of 2 to 5; and v can be an integer of 0, 1, 2, or 3 to about 5, about 15, about 30, or about 40. The weight average molecular weight of the polyamidoamine prepolymer having the chemical formula (E) can be about 2,000, about 5,000, about 7,500, about 10,000, about 20,000, or about 30,000 to about 50,000, about 55,000, about 60,000, about 80,000, about 100,000, about 200,000, about 500,000, about 750,000, or about 1,000,000.

Illustrative polyamidoamine prepolymers having the chemical formula (E) can be produced by reacting one or more dicarboxylic acids (diacid), or a corresponding dicarboxylic acid halide or diester thereof, with one or more polyamines, such as a polyalkylene polyamine. Illustrative polyamines include those polyamines (polyamine prepolymers) discussed and described above. For example, the polyamidoamine can be made by reacting one or more polyalkylene polyamines, such as polyethylenepolyamines including ethylenediamine; diethylenetriamine (DETA); triethylenetetramine (TETA); aminoethyl piperazine; tetraethylenepentamine; pentaethylenehexamine; N-(2-aminoethyl) piperazine; N,N-bis(2-amino ethyl)ethylene diamine; diamino ethyl triaminoethylamine; piperazinethyl triethylenetetramine; or any mixture thereof with one or more polycarboxylic acids. Illustrative polycarboxylic acids can include, but are not limited to, succinic acid; glutaric acid; 2-methylsuccinic acid; adipic acid; pimelic acid; suberic acid; azelaic acid; sebacic acid; undecanedioic acid; dodecandioic acid; 2-methylglutaric acid; 3,3-dimethylglutaric acid; tricarboxypentane acids such as 4-carboxypimelic acid; alicyclic saturated acids, such as 1,2-cyclohexanedicarboxylic acid, 1-3-cyclohexanedicarboxylic acid, 1,4-cyclohexanedicarboxylic acid, and 1-3-cyclopentanedicarboxylic acid; unsaturated aliphatic acids such as maleic acid, fumaric acid, itaconic acid, citraconic acid, mesaconic acid, aconitic acid, and hexane-3-diotic acid; unsaturated alicyclic acids, such as 1,4-cyclohexenedicarboxylic acid; aromatic acids, such as phthalic acid, isophtalic acid, terephthalic acid, 2,3-naphthalenedicarboxylic acid, and benzene-1,4-diacetic acid; and heteroaliphatic acids, such as diglycolic acid, thiodiglycolic acid, dithiodiglycolic acid, iminodiacetic acid, and methyliminodiacetic; or any mixture thereof. In one example, diacids and the related diesters of the formula $RO_2C(CH_2)_nCO_2R$, where n can be an integer of 1 to about 10 and R can be hydrogen, methyl, or ethyl, and mixtures thereof can be used.

As noted above, the secondary amines of the polyamine prepolymers can be reacted with one or more functionally symmetric or "symmetric" crosslinkers. Unlike the function of the asymmetric crosslinker epichlorohydrin, the functionally symmetric crosslinkers or simply "symmetric crosslinker" can include or provide the same moiety for reaction with both prepolymer secondary amine groups to effect crosslinking. Reacting the polyamine prepolymer with the symmetric crosslinker can provide a greater degree of control over the crosslinking process and/or can provide a partially crosslinked prepolymer having a greater molecular weight than the starting prepolymer. The viscosity end-point and thus the molecular weight of the partially crosslinked prepolymer can be pre-determined and controlled by the amount of symmetrical crosslinker reacted with the polyamine prepolymer. The crosslinking reaction can proceed to an end-point as the crosslinker is consumed and stop when consumption of crosslinker is complete. A decreased and measureable amount of secondary amine functionality can remain available for further functionalization.

The polyamine prepolymer can be reacted with a deficiency of the symmetric crosslinker, based on the total amount of secondary amines available for crosslinking, to provide the partially crosslinked polyamine. Thus, the partially crosslinked polyamine can have a greater molecular weight than the polyamine, even though it is an intermediate in the process and it retains a portion of the secondary amine groups present in the polyamine prepolymer. The partially crosslinked polyamine can also retain a majority of the secondary amine groups present in the polyamine prepolymer. For example, reacting the polyamine prepolymer with less than 50% of the stoichiometric amount of the symmetric crosslinker can produce a partially crosslinked polyamine that includes or retains a majority of the secondary amine groups present in the polyamine prepolymer.

The molar ratio of the polyamine prepolymer to the symmetric crosslinker can be about 2:1 or more. For example, the molar ratio of the polyamine prepolymer to the symmetric crosslinker can be about 2:1, about 2.1:1, about 2.2:1, about 2.3:1, about 2.4:1, or about 2.5:1 to about 2.7:1, a bout 3:1, about 3.3:1, or about 3.5:1 or more. The symmetric crosslinker to polyamine prepolymer molar ratio can be selected to provide more than 0%, but less than 50%, less than 45%, less than 40%, less than 35%, less than 30%, less than 25%, less than 20%, less than 15%, less than 10%, less than 5%, less than 4%, less than 3%, less than 2%, less than 1%, less than 0.75%, or less than 0.5% of the stoichiometric ratio of the symmetric crosslinker to the polyamine prepolymer. For example, the symmetric crosslinker to polyamine prepolymer molar ratios can provide about 0.1% to about 4%, about 0.2% to about 3.5%, about 0.3% to about 3%, about 0.4% to about 2.5%, about 0.5% to 2%, or about 0.6% to 1.5% of the stoichiometric ratio of the symmetric crosslinker to the polyamine prepolymer. It should be understood that these values reflect the combined molar amounts when using more than one symmetric crosslinker. A stoichiometric ratio of the polyamine prepolymer to the symmetric crosslinker is 2:1. More particularly, based on the prepolymer repeating unit having a single secondary amine subject to reaction and the symmetric crosslinker having two reactive moieties, a stoichiometric reaction of polyamine prepolymer to the symmetric crosslinker would be a 2:1 molar ratio.

Examples of symmetric crosslinkers can include, but are not limited to, a diacrylate compound, a bis(acrylamide) compound, a diepoxide compound, a polyazetidinium compound, a bis(methacrylamide) compound, a poly(alkylene glycol) diglycidyl ether compound, a dialdehyde compound, a diisocyanate compound, a 1,3-dialkyldiazetidine-2,4-dione compound, a dianhydride compound, a diacyl halide compound, a dienone compound, a dialkyl halide compound, or any mixture thereof. By way of example, useful symmetric crosslinkers can be selected from or can include compounds having one or more of the following chemical formulas:

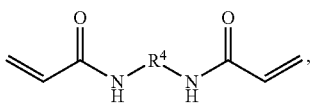

where $R^4$ can be $(CH_2)_d$, and d can be an integer of 1, 2, 3, or 4;

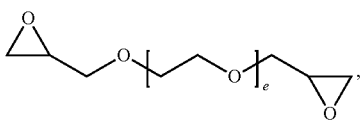

where e can be an integer of 1 to about 100;

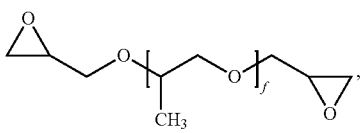

where f can be an integer of 1 to about 100;

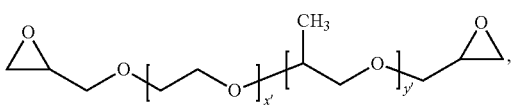

where x'+y' is from 1 to about 100; and/or

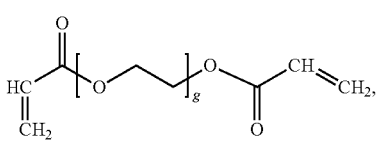

where g can be an integer of 1 to about 100.

Specific examples of symmetric crosslinkers can include, but are not limited to, N,N'-methylene-bis-acrylamide (MBA), N,N'-methylene-bis-methacrylamide (MBMA), poly(ethylene glycol) diglycidyl ether (PEG-DGE), poly(propylene glycol) diglycidyl ether (PPG-DGE), polyethylene glycol diacrylate (PEG-DA), poly(propyleneglycol) diacrylate (PPG-DA), one or more polyazetidinium compounds, somers thereof, alkylated derivatives thereof, salts thereof, or any mixture thereof.

The symmetric crosslinkers can also be or include polymers or co-polymers that have a type of functional moiety that is reactive with secondary amines. For example, the symmetric crosslinker can be a polymer or copolymer that includes azetidinium functional groups. These symmetric crosslinkers can be, for example, copolymers of acrylates, methacrylates, alkenes, dienes, or derivatives thereof with azetidinium-functionalized monomers. Illustrative azetidinium-functionalized monomers can include, but are not limited to, 1-isopropyl-3-(methacryloyloxy)-1-methylazetidinium chloride having the chemical formula (F) or 1,1-diallyl-3-hydroxyazetidinium chloride having the chemical formula (G), other halogen derivatives thereof, salts thereof, or mixtures thereof:

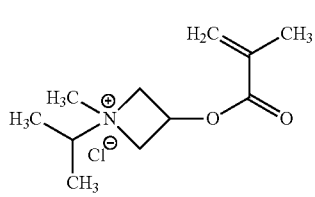

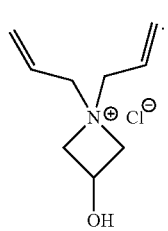

The symmetric crosslinkers can also can be or include copolymers of one or more acrylates, one or more methacrylates, one or more alkenes, one or more dienes, or any combination thereof with other azetidinium-functionalized monomers. Other illustrative azetidinium-functionalized monomers can include, but are not limited to, compounds having the chemical formulas (H), (I), and (J):

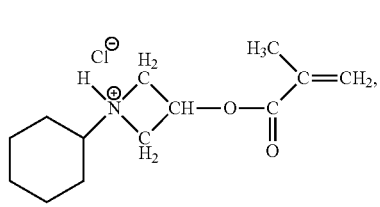

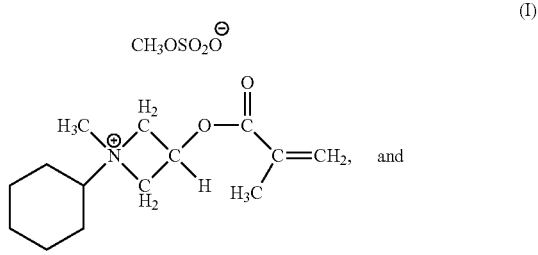

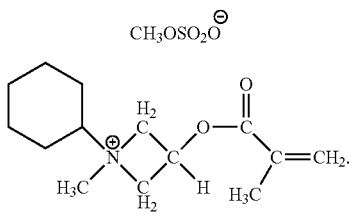

The symmetric crosslinker can also be or include a copolymer of an acrylate monomer, a methacrylate monomer, an alkene monomer, and/or a diene monomer with an azetidinium-functionalized monomer having one of the chemical formulas (F), (G), (H), (I), (J), derivatives thereof, isomers thereof, halides thereof (replacement of Cl with F, Br, or I), or any mixture thereof, where the fraction of the azetidinium-functionalized monomer to the acrylate monomer, the methacrylate monomer, the alkene monomer, or the diene monomer in the copolymer can be about 0.1% to about 12%. For example, the fraction of the azetidinium-functionalized monomer to the acrylate monomer, the methacrylate monomer, the alkene monomer, or the diene monomer in the copolymer can be about 0.2%, about 0.5%, about 0.75%, about 1%, about 2%, or about 3% to about 5%, about 6%, about 8%, or about 10%. Examples of these types of symmetric crosslinker polymers and co-polymers can be found in the following references: Y. Bogaert, E. Goethals and E. Schacht, Makromol. Chem., 182, 2687-2693 (1981); M. Coskun, H. Erten, K. Demirelli and M. Ahmedzade, Polym. Degrad. Stab., 69, 245-249 (2000); and U.S. Pat. No. 5,510,004.

The symmetric crosslinker can also be or include a relatively lower azetidinium-functionalized polyamidoamine. That is, the polyamidoamine can have minimal azetidinium functionalization, which can be the reactive moiety in this type of symmetric crosslinker. In this aspect, the crosslinking function can be effected by the azetidinium moieties that can react with secondary amines of the polyamidoamine prepolymer. Polyamidoamines that can be used to prepare the minimally azetidinium-functionalized polyamidoamines can have the same general chemical formulas that can be used for the preparation of the resin itself, such as the chemical formulas (K), (L), and/or (M) illustrated below. For example, a minimally azetidinium-functionalized polyamidoamine suitable for use as a symmetric crosslinker can have the following chemical formula (K):

symmetrical crosslinker. As the j/k ratio indicates, there is a small fraction of azetidinium moieties as compared to acid and amine residues. Moreover, the polyamidoamine having the chemical formula (K) can also have the structure where the j/k ratio can be about 12 to about 500, about 14 to about 400, about 16 to about 300, about 18 to about 200, or about 20 to about 100. One type of minimally azetidinium-functionalized polyamidoamine include those discussed and described in U.S. Pat. No. 6,277,242.

Other examples of symmetric crosslinkers can include, but are not limited to, one or more diisocyanates, one or more 1,3-dialkyldiazetidine-2,4-diones, one or more dianhydrides, one or more diacyl halides, one or more dienones, one or more dialkyl halides, or any mixture thereof. The diisocyanate can be unblocked or blocked. Illustrative unblocked diisocyanates can include, but are not limited to, 4,4'-methylene diphenyl diisocyanate (methylene diphenyl diisocyanate, MDI); toluene-2,4-diisocyanate (toluene diisocyanate, TDI); 1,6-hexane diisocyanate (hexamethylene diisocyanate, HDI); 5-isocyanato-1-(isocyanatomethyl)-1,3,3-trimethyl-cyclohexane (isophorone diisocyanate, IPDI), or any mixture thereof. Illustrative blocked diisocyanates can include, but are not limited to, bis-caprolactam blocked 4,4'-methylene diphenyl diisocyanate; 4,4'-methylene diphenyl diisocyanate bis(2-buanone oxime) adduct, bis-(3,5-dimethylpyrazole) blocked 4,4'-methylene diphenyl diisocyanate, or any mixture thereof. Commercially available blocked diisocyanates can include, but are not limited to, the TRIXENE® BI products available from Baxenden Chemicals such as TRIXENE® BI 7641, 7642, 7674, 7675, 7950, 7951, 7960, 7961, 7963, and 7982, and the RUCO-Guard products available from Rudolf Group such as RUCO-Guard XCR, XTN, FX 8011, FX 8021, NET, TIE, and WEB.

Illustrative 1,3-dialkyldiazetidine-2,4-diones can include, but are not limited to, 1,3-diazetidine-2,4-dione; 1,3-dimethyl-1,3-diazetidine-2,4-dione; 1,3-diethyl-1,3-diazetidine-2,4-dione; 1,3-Diphenyl-1,3-diazetidine-2,4-dione; or any mixture thereof. Illustrative dianhydrides can include, but are not limited to, pyromellitic dianhydride (PMDA); ethyleneglycol bis(trimellitic anhydride); 4,4'-bisphenol A dianhydride, or any mixture thereof. Illustrative diacyl halides can include, but are not limited to, oxalyl chloride, oxalyl bromide, succinyl chloride, benzene-1,2-dicarbonyl dichloride, benzene-1,2-dicarbonyl bromide, phthaloyl chloride, or any mixture thereof. Illustrative dienones can include, but are not limited to, 1,7-octadiene-3,6-dione; bis(2-propen-1-one)-(1,4-benzene), or any mixture thereof. Illustrative dialkyl halides can include, but are not limited to, 1,2-

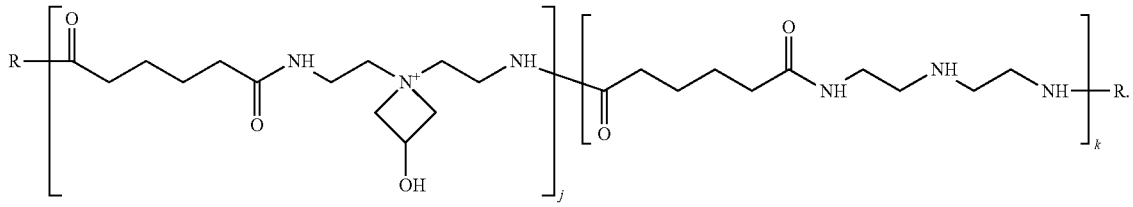

In the chemical formula (K), j can be greater than or equal to 2, the j/k ratio can be from about 10 to about 1,000, and the chemical formula (K) can include at least two azetidinium moieties that function to crosslink and qualify the structure such as the chemical formula (K) as a functionallydichloroethane; 1,2-dibromoethane; 1,2-diiodoethane; 1,2-dichloropropane; 1,2-dibromopropane; 1,3-dichloropropane; 1,3-dibromopropane; 1,3-diiodopropane; 1,4-bis(chloromethyl)benzene; 1,4-bis(bromomethyl)benzene, or any mixture thereof.

Illustrative dialdehydes can include, but are not limited to, dialdehydes having the formula OHC(CH$_2$)$_n$CHO, where n is 0 to about 8, and mixtures thereof. Specific dialdehydes can include, but are not limited to, glyoxal, pyruvic aldehyde, succinaldehyde, glutaraldehyde, and 2-hydroxyadipaldehyde. Based on its availability, glyoxal is particularly preferred.

By way of example, using a polyamidoamine prepolymer produced by reacting adipic acid and diethylenetriamine (DETA) and crosslinking the prepolymer with methylene-bis-acrylamide (MBA), the partially crosslinked polyamine prepolymer can be illustrated by the following chemical formula (L):

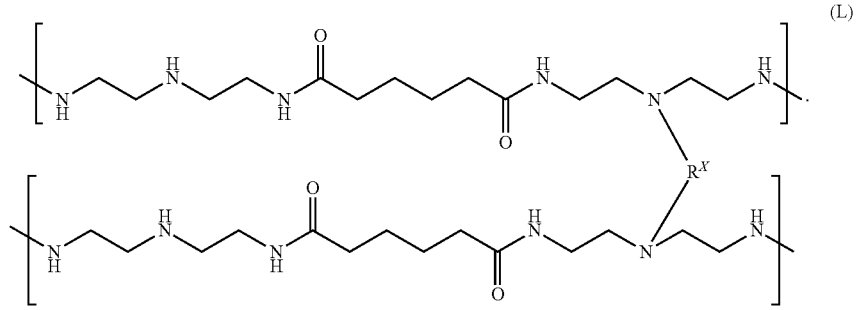

The $R^X$ bridging moiety in the chemical formula (L) can have the chemical formula:

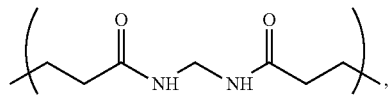

where the crosslinking moiety $R^X$ can be derived from MBA.

In other examples, the crosslinked resin (K) can have the crosslinking moiety $R^X$ with the chemical formula:

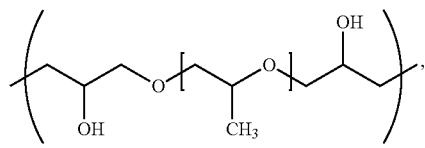

where the crosslinking moiety $R^X$ can be derived from PPG-DGE. It should be understood that this exemplary, partially crosslinked polyamine having chemical formula (L) does not reflect the use of any mono-functional modifiers, which are further discussed and described below, in addition to the symmetrical crosslinker.

In some examples, the $M_w$ of the crosslinked resin (L) can be about 50,000, about 60,000, about 70,000, about 80,000, about 90,000, or about 100,000 to about 120,000, about 150,000, about 200,000, about 300,000, about 500,000, about 700,000, about 800,000, about 1,000,000, about 1,200,000, about 1,400,000, about 1,500,000, about 1,600,000, about 1,800,000, about 2,000,000, about 2,500,000, about 3,000,000, about 3,500,000, about 4,000,000, or greater. For example, the $M_w$ of the crosslinked resin (L) can be about 50,000 to about 4,000,000; about 50,000 to about 3,000,000; about 50,000 to about 2,000,000; about 50,000 to about 1,000,000; about 80,000 to about 4,000,000; about 80,000 to about 3,000,000; about 80,000 to about 2,000,000; about 80,000 to about 1,000,000; about 120,000 to about 4,000,000; about 120,000 to about 3,000,000; about 120,000 to about 2,000,000; about 120,000 to about 1,000,000; about 300,000 to about 3,000,000; about 300,000 to about 2,000,000; about 300,000 to about 1,000,000; about 300,000 to about 800,000; or about 300,000 to about 500,000.

The secondary amine groups of the polyamine prepolymers can also be reacted with one or more mono-functional compounds to impart any desired chemical functionality to the prepolymer. The mono-functional compounds can have a reactive group that can react with secondary or primary amines and a non-reactive part which can be cationic (to increase the cationic charge density), hydrophilic, or hydrophobic (to adjust the interaction with non-ionic segments of the cellulose fibers). As desired, the polyamine prepolymer can be reacted with a deficiency of a mono-functional modifier comprising one secondary amine-reactive moiety either before, during, or after, the step of reacting the polyamine prepolymer with a deficiency of the symmetric crosslinker. Further, the reaction with a stoichiometric deficiency of a mono-functional modifier can also be carried using any combination of reaction or addition before, during, or after, reaction with the symmetric crosslinker.

The mono-functional modifier can be or include, but is not limited to, one or more neutral or cationic acrylate compounds, one or more neutral or cationic acrylamide compounds, one or more acrylonitrile compounds, one or more mono-epoxide compounds, or any mixture thereof. Illustrative mono-functional modifiers can include, but are not limited to, an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, or any mixture thereof. Other suitable mono-functional modifiers can include compounds having the following chemical formulas shown below.

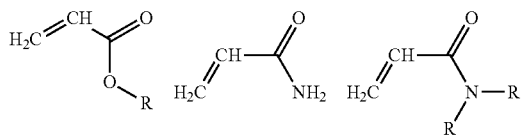

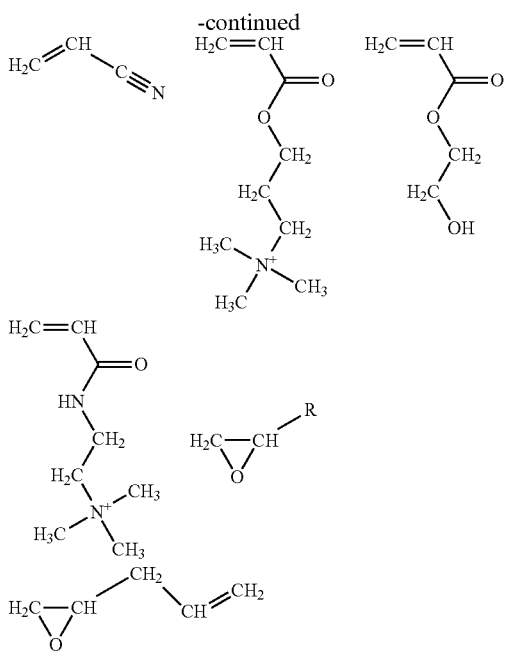

The mono-functional modifier can be or include, but is not limited to, methyl acrylate, alkyl acrylate, acrylamide, N-methylacrylamide, N,N-dimethylacrylamide, acrylonitrile, 2-methyloxirane, 2-ethyloxirane, 2-propyloxirane, 2-(allyloxymethyl)oxirane, 2-hydroxyethyl acrylate, 2-(2-hydroxyethoxy)ethyl acrylate, 2-(acryloyloxy)-N,N,N-trimethylethanaminium, 3-(acryloyloxy)-N,N,N-trimethylpropan-1-aminium, 2-acrylamido-N,N,N-trimethylethanaminium, 3-acrylamido-N, N, N-trimethylpropan-1-aminium, 1-isopropyl-3-(methacryloyloxy)-1-methylazetidinium chloride, or any mixture thereof. Depending, at least in part, on the structure of the mono-functional modifier, it can be seen that upon reaction of these compounds with a secondary or primary amine, the portion that is non-reactive toward the amine can impart cationic charge to assist in increasing the cationic charge density, can alter the hydrophilic or hydrophobic characteristics, for example to adjust the interaction with non-ionic segments of the cellulose fibers, and/or can affect other properties of the resulting intermediate crosslinked prepolymer.

Generally, by separating into discrete steps the reaction of the polyamine prepolymer with the symmetric crosslinker from the reaction of the partially crosslinked polyamine with the epihalohydrin, the second reaction step can require less epihalohydrin than conventional methods to reach the desired end-point. Further, this second reaction step can be effected under reaction conditions that favor optimized azetidinium group formation over further crosslinking. The asymmetric functionality of epihalohydrin can be useful in this functionalization to allow a relatively easy reaction of the epoxy group with secondary amines to form a pendant chlorohydrin moiety, followed by an intramolecular cyclization of the pendant halohydrin to generate a cationic azetidinium functionality. The latter intramolecular cyclization can generally be accomplished by heating the halohydrin-functionalized polymer.

In one example, the second reaction step can be carried out using any epihalohydrin, such as epichlorohydrin, epibromohydrin, and epiiodohydrin, or any mixture thereof. It should be understood that when referring to epichlorohydrin in this disclosure, such as in structures or reaction schemes, any one or any combination of the epihalohydrins can be used in the process.

By way of example, using the partially crosslinked polyamine prepolymer having chemical formula (L) that was produced by reacting a polyamine prepolymer formed by reacting adipic acid and DETA and MBA as the symmetric crosslinker, the epichlorohydrin functionalized product can be illustrated by the chemical formula (M), also referred to as a "halohydrin-functionalized polymer" or "halohydrin-functionalized resin".

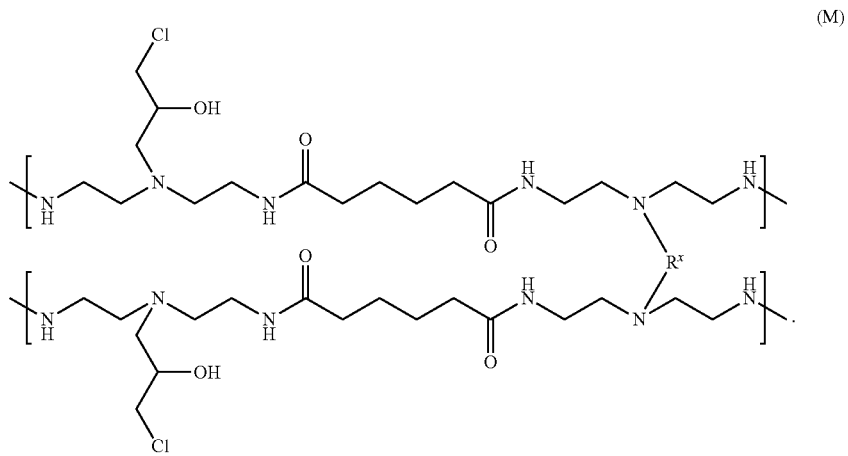

(M)

where the epihalohydrin is epichlorohydrin. As before, this illustration does not reflect the use of any mono-functional modifiers in addition to the symmetric crosslinker. The reaction of epihalohydrins such as epichlorohydrin can be tailored to consume a high percentage or the remaining secondary amine moieties in generating the halohydrin-functionalized polymer, in this case, a chlorohydrin-functionalized polymer.

The stoichiometric reaction of epichlorohydrin with a secondary amine group can require a molar ratio of epichlorohydrin to the secondary amine group of 1:1. The preparation of the halohydrin-functionalized polymer can use a widely varying amount of epihalohydrin relative to the secondary amine groups. For example, the molar ratio of the epihalohydrin to the secondary amine can be about 0.8:1 to about 3:1. In another example, the molar ratio of the epihalohydrin to the secondary amine can be about 0.9:1 to about 2.5:1, about 1:1 to about 2:1, about 1.1:1 to about 1.7:1, about 1.2:1 to about 1.5:1, about 1.25:1 to about 1.45:1. In another example, the molar ratio of the epihalohydrin to the secondary amine can be about 0.8:1, about 0.9:1, about 1:1, about 1.1:1, about 1.2:1, about 1.3:1, about 1.4:1, about 1.5:1, or about 1.6:1.

(DCP at 25%) can be less than 15,000 ppm, less than 14,000 ppm, less than 13,000 ppm, less than 12,000 ppm, less than 11,500 ppm, less than 11,000 ppm, less than 10,500 ppm, less than 10,000 ppm, less than 8,000 ppm, less than 6,000 ppm, or less than 5,000 ppm.

The chlorohydrin-functionalized resin (M) can be subjected to conditions sufficient to intramolecularly cyclize the pendent chlorohydrin to impart azetidinium functionality during a cyclization step. The product resin is the azetidinium-functionalized crosslinked resin having the following chemical formula (N):

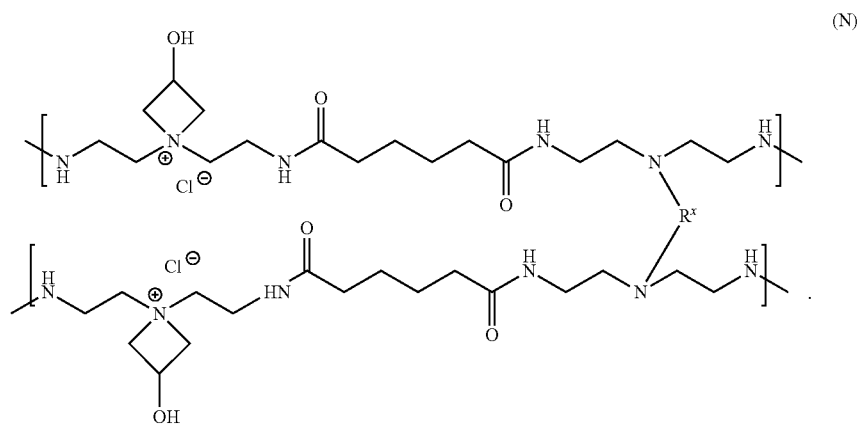

The amount of the symmetric crosslinker and the epihalohydrin can be sufficient such that the resin composition produced can include substantially no secondary amine groups. This result can be effected by using the molar amounts and ratios disclosed herein, but resin compositions prepared by this disclosure can include substantially no secondary amine groups even when molar amounts and ratios outside those recited may be used. By substantially no secondary amine groups, it is intended that less than 10% of the original secondary amines in the starting polyamine prepolymer prior to it crosslinking, functionalization, and cationization reactions remain. Alternatively, less than 5%; alternatively, less than 2%; alternatively, less than 1%; alternatively, less than 0.5%; alternatively, less than 0.2%; alternatively, less than 0.1%; alternatively, less than 0.01%; alternatively, less than 0.005%; or alternatively, less than 0.001% of the original secondary amines in the starting polyamine prepolymer remain.

The halohydrin-functionalized polymer, e.g., chlorohydrin-functionalized polymer, can be converted to an azetidinium-functionalized crosslinked resin by subjecting the halohydrin-functionalized polymer to cyclization conditions to form azetidinium ions. This step can include heating the halohydrin-functionalized polymer. In contrast to the conventional method in which heating induces both crosslinking and cyclization, the crosslinking portion of this process is complete when the cyclization is carried out, thereby affording greater process control and the ability to more closely tailor the desired properties of the resulting resin.

The synthesis processes described herein can reduce and/or minimize the formation of 1,3-dichloro-2-propanol (1,3-DCP or "DCP"), 3-chloropropane-1,2-diol (3-CPD or "CPD"), and/or other epichlorohydrin by-products. The concentration of epichlorohydrin 1,3-dichloro-2-propanol (1,3-DCP) remaining in the wet strength resin at 25% solids In the process for producing the PAE resin that includes the azetidinium ions, the PAE resin can be produced by subjecting the halohydrin-functionalized polymer to cyclization conditions sufficient to convert the halohydrin groups to form azetidinium ions. For example, at least a portion of the halohydrin groups can be cyclized to form azetidinium ions. In another example, at least 90% of the halohydrin groups can be cyclized to form azetidinium ions. In another example, at least 95%, at least 97%, at least 98%, at least 98.5%, at least 99%, at least 99.5%, at least 99.7%, at least 99.8%, or at least 99.9% of the halohydrin groups can be cyclized to form azetidinium ions. In yet another example, about 90% or more, about 91% or more, about 92% or more, about 93% or more, about 94% or more, about 95% or more, about 96% or more, about 97% or more, about 98% or more, about 99% or more, about 99.3% or more, about 99.5% or more, about 99.7% or more, about 99.9% or more of the halohydrin croups can be cyclized to form azetidinium ions.

The amount of the halohydrin groups cyclized to form azetidinium ions can be measured via titration with silver nitrate. More particularly, the total chlorine content for a first sample of a PAE resin can be measured by refluxing in the presence of potassium hydroxide to convert all covalently-bound chlorine to chloride ion, neutralizing with nitric acid, and titrating with a silver nitrate solution. The total chlorine is therefore the sum of covalently-bound chlorine and ionic chloride. The amount of the ionic chloride is measured on a second sample of the PAE resin, which does not involve refluxing in the presence of the potassium hydroxide. The total amount of chlorine minus the amount of ionic chloride is the amount of chlorine (halohydrin groups) that can be cyclized to form azetidinium ions.

After cyclizing the halohydrin-functionalized polymer to produce the PAE resin, the pH of the PAE resin can be adjusted to about 2 to about 4.5. For example, the PAE resin can have or be adjusted to have a pH of about 2, about 2.2, about 2.5, or about 2.7 to about 3.7, about 4, about 4.2, or about 4.5. The solids content of the PAE resin can also be adjusted. For example, the PAE resin can have or be adjusted to have a solids content of about 5%, about 10%, about 15%, or about 20%, or about 25% to about 30%, about 35%, about 40%, about 45%, or about 50% solids. In another example, the PAE resin can have a solids content of about 20%, about 23%, about 25%, about 27%, or about 30%.

The PAE resin can have a charge density of about 1 mEq/g to about 4 mEq/g of solids. For example, the PAE resin can have a charge density of about 1 mEq/g, about 1.5 mEq/g, about 2 mEq/g, about 2.25 mEq/g, about 2.3 mEq/g, about 2.4 mEq/g, or about 2.5 mEq/g to about 3 mEq/g, about 3.2 mEq/g, about 3.35 mEq/g, about 3.4 mEq/g, about 3.5 mEq/g, or about 4 mEq/g. The charge density of the cross-linked resin can be measured by streaming electrode potential using a titrator or a particle charge detector (PCD), such as a Mitek PCD.

The PAE resin can have a ratio of azetidinium ions to amide residues, which can be abbreviated by "Azet ratio," of about 0.4 to about 1.3. For example, the PAE resin can have a ratio of azetidinium ions to amide residues of about 0.4, about 0.5, about 0.6, or about 0.7 to about 0.9, about 1, about 1.15, about or about 1.2. The PAE resin can have a ratio of azetidinium ions to secondary amine moieties of about 0.4 to about 1, about 0.55 to about 0.8, about 0.45 to about 0.95, or about 0.65 to about 1.1. The Azet ratio can be measured by quantitative $^{13}$C NMR by comparing the methylene carbons of the azetidinium versus the methylenes of the acid residue in the backbone.

The PAE resin can have a weight average molecular weight of about 20,000 to about 3,000,000. For example, the PAE resin can have a weight average molecular weight of about 20,000, about 35,000, about 50,000, about 100,000, about 250,000, or about 500,000 to about 900,000, about 1,000,000, about 1,500,000, about 1,700,000, about 2,000,000, about 2,500,000, or about 3,000,000. In another example, the PAE resin can have a weight average molecular weight of about 900,000 to about 1,100,000, about 700,000 to about 1,500,000, about 50,000 to about 500,000, about 600,000 to about 2,000,000, about 600,000 to about 1,600,000, or about 300,000 to about 1,200,000.

The PAE resin can have an azetidinium equivalent weight of about 1,600 to about 3,800. For example, the PAE resin can have an azetidinium equivalent weight of about 1,600, about 1,800, about 2,000, or about 2,300 to about 2,700, about 2,900, about 3,300, about 3,500, or about 3,800. The azetidinium equivalent weight is defined as the degree of polymerization multiplied by the Azet ratio, or (degree of polymerization)×(Azet).

Illustrative PAE resins and methods for making same can include those discussed and described in U.S. Patent Application Publication No.: 2014/0020858.

Any GPAm resin or mixture of GPAm resins can be combined with the PAE resin to produce the resin composition. In one example, the GPAm resin can be produced by reacting a base polyacrylamide having pendant amide groups with glyoxal to produce a first product that includes glyoxalated polyacrylamide. One or more acids can be mixed, blended, or otherwise combined with the first product produce the GPAm resin that includes the glyoxalated polyacrylamide and has a reduced pH relative to the first product. In one or more examples, the GPAm resin can be produced by reacting a base polyacrylamide having pendant amide groups with a first portion or first amount of glyoxal to produce a first intermediate glyoxalated polyacrylamide that includes glyoxalated polyacrylamide. One or more acids can be mixed, blended, or otherwise combined with the first intermediate glyoxalated polyacrylamide to produce a second intermediate glyoxalated polyacrylamide that includes the glyoxalated polyacrylamide and has a reduced pH relative to the first intermediate. A second portion or second amount of glyoxal can be mixed, blended, or otherwise combined with the second intermediate glyoxalated polyacrylamide to produce the glyoxalated polyacrylamide or GPAm.

The base polyacrylamide can be prepared by free radical polymerization of a base acrylamide monomer in an aqueous system or medium in the presence of a chain transfer agent, such as 2-mercaptoethanol. The base acrylamide monomer can provide the primary reaction sites on the base polyacrylamide that can react with the glyoxal. The base polyacrylamide should have a sufficient number of base acrylamide monomers in its structure to provide enough pendant amide groups that can produce a thermosetting glyoxalated polyacrylamide once reacted with glyoxal. The amount of the base acrylamide monomer can be at least 10 mol % based on the total number of monomers used to prepare the base polyacrylamide polymer. For example, the amount of the base acrylamide monomer in the base polyacrylamide can be about 10 mol %, about 20 mol %, about 30 mol %, about 40 mol %, or about 50% to about 55 mol %, about 60 mol %, about 65 mol %, about 70 mol %, about 75 mol %, about 80 mol %, or more, based on the total number of monomers used to prepare the base polyacrylamide polymer.

As used herein, the term "base acrylamide monomer" refers to primary vinylamides. Illustrative primary vinylamides can include, but are not limited to, acrylamide, one or more substituted acrylamides, or any mixture thereof. Illustrative substituted acrylamides can include, but are not limited to, methacrylamide, ethylacrylamide, crotonamide, N-methyl acrylamide, N-butyl acrylamide, N-ethyl methacrylamide, or any mixture thereof. As such, the term "base acrylamide polymer" includes not only polymers made only from acrylamide monomers, but also polymers made from other primary vinylamides or any mixture thereof.

One or more unsaturated cationic co-monomers can be reacted with the base acrylamide monomer to produce the base polyacrylamide. As such, the base polyacrylamide can have cationic character for strengthening paper. The amount of cationic co-monomer can be sufficient to render the base polyacrylamide self-substantive to cellulose fibers in aqueous suspensions. The quantity of the base polyacrylamide retained on the cellulose fibers can be determined by measuring the nitrogen content of the fibers both before and after treatment with the polyacrylamide composition.

A few cationic co-monomers or even a single cationic co-monomer, in each base acrylamide molecule can be sufficient to provide the base polyacrylamide with an adequate cationic character to make the base polyacrylamide substantive to cellulose fibers. A base polyacrylamide that has a suitable amount of cationic character can be obtained by including at least about 0.001 moles of cationic monomer and up to about 0.25 moles or more of the cationic co-monomer, per mole of acrylamide monomer. For example, about 0.01 moles, about 0.02 moles, or about 0.03 moles to about 0.1 mole, about 0.13, or about 0.15 moles of the cationic co-monomer per mole of base acrylamide monomer can provide a base polyacrylamide with sufficient cationic character. In one example, the base polyacrylamide can be produced from a mixture of base acrylamide and diallyldimethyl ammonium chloride in a molar ratio between about 99:1 and about 75:25.

Illustrative cationic co-monomers can include, but are not limited to, a diallyl quaternary monomer, 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate, or any mixture thereof. One illustrative diallyl quaternary monomer can include diallyldimethylammonium chloride (DADMAC). In addition to or in lieu of chloride, the counterion for the cationic monomers can be fluoride, bromide, iodide, sulfate, methylsulfate, phosphate, and the like.

The cationic co-monomer and the base acrylamide monomer can be reacted with one another in any desired manner. For example, the base polyacrylamide can be produced by combining all of the cationic co-monomer with the base acrylamide monomer at the beginning of the polyacrylamide polymerization reaction. In another example, the base polyacrylamide can be produced by combining the cationic co-monomer continuously along with base acrylamide monomer over the course of the polymerization reaction. In another example, the base polyacrylamide can be produced by combining all of the cationic co-monomer, but only after a certain conversion of the base acrylamide to form a polyacrylamide homopolymer has occurred.

Other vinyl monomers that can be present during preparation of the base polyacrylamide and thus become incorporated into the base polyacrylamide can include, but are not limited to, diluter monomers, other functional monomers, or any mixture thereof. The diluter monomers can reduce an amount of the base acrylamide monomer and the cationic co-monomer needed to produce a given amount of base polyacrylamide, but do not provide any functional site for modification of the polymer. The other functional monomers can include non-amide vinyl monomers that can be incorporated into the base polymer and have pendant groups that also may react with glyoxal.

Illustrative diluter monomers can include, but are not limited to, acrylic esters, acrylonitrile, vinyl acetate, N-vinyl pyrrolidone, N,N'-dimethyl acrylamide, hydroxy alkyl (meth) acrylates, styrene and the like. Illustrative acrylic esters can include, but are not limited to, ethyl acrylate, methylmethacrylate, or a mixture thereof. Illustrative other functional monomers can include, but are not limited to, allylglycidal ether, glycidyl methacrylate, or a mixture thereof. Other illustrative co-monomers can include, but are not limited to, co-monomers with a 1,2-diol in its structure, such as 3-allyloxy-1,2-propandiol, 3-acryloyloxy-1,2-propandiol, methacryloyloxy-1,2-propandiol, or any mixture thereof. The diluter monomers can be present in the reaction mixture in an amount of up to about 0.5 moles per mole of base acrylamide monomer. The amount of other functional monomers can be present in the reaction mixture in an amount of up to about 0.15 moles per mole of base acrylamide monomer.

In one or more examples, a di-functional co-monomer can be used to produce a branched base polyacrylamide. Illustrative di-functional co-monomers can include, but are not limited to, N,N'-methylene-bisacrylamide, N,N'-methylene-bismethacrylamide, N-allyl acrylamide, N-allyl methacrylamide, or any mixture thereof.

One or more chain transfer agents can be mixed, blended, or otherwise combined with the base acrylamide monomer and the cationic co-monomer to produce the base polyacrylamide. As understood by those skilled in the art, the chain transfer agent can function to limit or control the molecular weight of the polymer formed by the free radical polymerization reaction taking place between the monomeric reactants. Thus, a chain transfer agent preferably is used in an amount sufficient to limit the molecular weight to a desired endpoint. The amount of the chain transfer agent generally included in the reaction mixture can be about 0.1 wt %, about 0.5 wt %, about 1 wt %, or about 5 wt % to about 15 wt %, about 20 wt %, about 25 wt %, or about 30 wt %, based on the weight of the monomers.

The chain transfer agent usually is charged into the reaction mixture at the outset of the polymerization, though it too may be added later in the reaction or in increments if desired. Any material that is able to control/limit the extent of the polymerization via chain transfer can be used as the chain transfer agent. Illustrative chain transfer agents can include, but are not limited to, allyloxypropane diol, thioglycol, and mercaptans such as 2-mercaptoethanol, hydroxyethyl-3-mercaptopropionate, dodecylmercaptan, or any mixture thereof.

As noted above, the base polyacrylamide can be prepared by free radical polymerization of the base acrylamide monomer and the cationic monomer. Similarly, the base polyacrylamide can be prepared by free radical polymerization of the base acrylamide monomer, the cationic monomer, and the optional diluter, functional, and/or di-functional monomers. Illustrative free radical initiators can include, but are not limited to, one or more peroxides, one or more zao-compounds, or any mixture thereof. Other useful initiators are the water-soluble compounds such as hydrogen peroxide and the sodium, potassium and ammonium persulfates used by themselves or in activated redox systems. Illustrative peroxides can include, but are not limited to, t-butyl hydroperoxide, cumene hydroperoxide, benxoyl peroxide, t-butoxyperoxy hexanoate, or any mixture thereof. Illustrative azo-compounds can include, but are not limited to, as azodiisobutyronitrile (AIBN), azodiisobutyramidine dihydrochloride (AIBA), dimethylazodiisobutyrate, or any mixture thereof.

As well understood by those skilled in the art, the amount of initiator can be sufficient to yield an acceptable reaction rate and, in combination with the level of monomeric reactants and the chain transfer agent, as further described below, a base polyacrylamide having a suitable molecular weight can be produced that can be water soluble. The amount of initiator, however, should not be so high as to result in an uncontrolled rate of reaction and possible gel formation. The amount of initiator ca be in the range of about 0.01 wt %, about 0.1 wt %, about 0.2 wt %, or about 0.5 wt % to about 1 wt %, about 2 wt %, or about 3 wt %. The initiator can be present at the outset of the polymerization, however, incremental addition of the initiator throughout polymerization can also be employed. Additional amounts of initiator (introduced by itself or associated with a reducer) can be used at the end of the reaction in order to consume any residual un-reacted monomers.

The polymerization can be carried out at a temperature of about 30° C., about 45° C., or about 60° C. to about 80° C., about 90° C., or about 100° C. The polymerization can also be carried out in the presence of one or more aliphatic alcohols. Suitable aliphatic alcohols can include, but are not limited to, ethanol, isopropyl alcohol, n-propanol, or butanol.

As understood by those skilled in the art, free radical solution polymerization reactions can be conducted by charging a reactor with appropriate amounts of the various monomers, the chain transfer agent, and the free radical initiator. An amount of water (and an optional water miscible solvent) can also be included in the reactor to provide a final solids concentration in the aqueous composition of about 5 wt %, about 10 wt %, about 15 wt %, or about 20 wt % to about 30 wt %, about 40 wt %, about 45 wt %, or about 50 wt %.

The base polyacrylamide, before glyoxalation, can have a weight average molecular weight of about of 500, about 1,000, about 2,500, about 5,000, about 10,000, or about 50,000 to about 100,000, about 250,000, about 500,000, or about 1,000,000. The base polyacrylamide can be water-soluble, before glyoxalation. In one or more examples, the base polyacrylamide can have a weight average molecular weight of less than 25,000, less than 15,000, or less than 10,000.

The base polyacrylamide polymer can be glyoxalated at an alkaline pH of about 7, about 7.2, about 7.5, or about 8 to about 8.5, about 9, about 9.5, or about 10. The pH of the base polyacrylamide can be controlled or adjusted with a buffer system. For example, a buffer of mono- and/or di-sodium phosphate can be used as a pH buffer. Other buffers can include any material that can function as both a weak acid and a weak base and can maintain the desired pH. Other illustrative buffers can include, but are not limited to, monopotassium phosphate plus borax, sodium hydroxide plus a mixture of acetic, phosphoric and boric acids, disodium phosphate plus citric acid.

Glyoxal (CHOCHO) can react with pendant amide groups on the base polyacrylamide (1) according to the following reaction to produce a polyacrylamide having a pendant glyoxalated group (2):

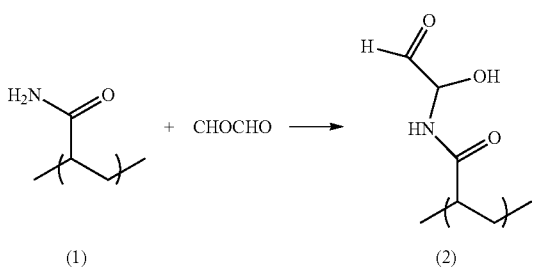

A second reaction can involve the so-formed aldehyde moiety on the base polyacrylamide backbone with another amide group, such as belonging to another macromolecule, and leads to building molecular weight and crosslinking.

To initiate the glyoxalation of the base polyacrylamide, the glyoxal can be provided in an amount of about 10 mol % to about 60 mol % of glyoxal, based on the molar concentration of pendant amide groups and other optional glyoxal-reactive functional groups in the base polyacrylamide can be added as the first of at least two separate portions to the polyacrylamide. Said another way, 1 to about 6 glyoxals can be supplied for every 10 pendant amide groups and other optional glyoxal-reactive functional groups in the polyacrylamide. The glyoxalation of the cationic polyacrylamide can be carried out at a temperature of about 15° C. to about 50° C. The glyoxalation of the cationic polyacrylamide can be carried out in an aqueous solution at a total solids concentration of about 8 wt % to about 30 wt %.

The first portion of glyoxal can be added to the base polyacrylamide in water to cause glyoxalation and some crosslinking between pendant amide and other glyoxal-reactive functional groups in the glyoxalated polyacrylamide. Such crosslinking can increase the molecular weight of the composition. The molecular weight can be increased sufficiently so as to obtain a desired viscosity in the range of about 30 cPs to about 80 cPs at a temperature of about 25° C. for a 20 wt % solids solution.

When a desired viscosity of the first intermediate glyoxalated polyacrylamide has been reached, the rate of the glyoxalation and related crosslinking reactions can be slowed and eventually substantially terminated by adding one or more acids thereto to produce the second intermediate glyoxalated polyacrylamide. For better control of the glyoxalation reactions, a two-step quenching procedure can be used. For example, the glyoxalation can start at a pH toward the upper end of the pH range suitable for the glyoxalation reaction in order to obtain a higher reaction rate. To control the reaction rate, at a certain extent of conversion short of the desired end-point, the pH can be reduced by adding an acid to the reaction mixture. For example, the pH can be reduced to about 7 to about 7.4. The reaction can continue at a reduced rate. After a final desired viscosity is reached, a second acid quench can be used to reduce the pH and substantially terminate or terminate the glyoxalation reactions. For example, the second acid quench can reduce the pH to about 3 to about 3.5.

The amount of acid added to the first intermediate glyoxalated polyacrylamide to produce the second intermediate glyoxalated polyacrylamide can be sufficient to provide lower the pH of the second intermediate product to about 3 to about 5. The acid added to the first intermediate glyoxalated polyacrylamide can include, one or more mineral acids, one or more organic acids, or any mixture thereof. Illustrative mineral acids can include, but are not limited to, hydrochloric acid, sulfuric acid, phosphoric acid, or any mixture thereof. Illustrative organic acids can include, but are not limited to, formic acid, acetic acid, citric acid, malic acid, lactic acid, or any mixture thereof.

A procedure for determining the amount of bound glyoxal in the glyoxalated polymer can include the procedure discussed and described in Biochemistry, Vol. 81, pp. 47-56 (1977). Additional details on suitable reaction conditions for binding glyoxal to the primary vinylamide can also include those discussed and in U.S. Pat. No. 3,556,932.

Following the acid quench, an optional second portion of glyoxal can be added to the composition to enhance the stability of the glyoxalated polyacrylamide. Accordingly, the second intermediate product can be the final GPAm resin if the second portion of glyoxal is not added. The second portion of glyoxal can be about 1 wt %, about 4 wt %, about 8 wt %, or about 12 wt % to about 30 wt %, about 40 wt %, about 50 wt %, about 60 wt %, or about 75 wt % of the first portion of glyoxal. By increasing the amount of free-glyoxal in the composition at this point, an equilibrium can be established that reduces the tendency of the composition to undergo further crosslinking before use, e.g., during shipping and storage. The GPAm resin that includes the second portion of glyoxal can exhibit an improved storage stability as compared to the second intermediate product that does not include the addition of the second portion of glyoxal.

The enhancement in stability provided by the two-step glyoxal addition cannot be obtained simply by adding a higher amount of glyoxal in the first portion. The kinetics of the glyoxalation reactions, in the presence of a higher initial amount of glyoxal, precludes the obtainment of a proper balance between molecular weight (extent of crosslinking) and residual free glyoxal that results in the higher level of stability observed for the present composition.

Further stability enhancement of the GPAm resin can be obtained by adding to the GPAm resin a buffer that can regulates or stabilize the pH of the GPAm resin to between about 3 and about 3.5. One suitable buffer can include a mixture of 20 parts by volume of a 0.2 M sodium hydroxide with 100 parts by volume of a stock solution containing 0.4 M acetic acid, 0.4 M phosphoric acid, and 0.4 M boric acid. This buffer can help maintain the pH of the GPAm resin relatively constant over a period of six weeks or more. Other buffers that could be used include materials that simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters. Other examples of buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxolate, potassium hydrogen maleate, potassium hydrogen succinate, potassium hydrogen glutarate, potassium hydrogen adipate, potassium tetraborate, potassium pentaborate, potassium octaborate and all the by forming amidol bonds. When only one aldehyde group reacts with amide functionality, a pendant aldehyde is attached to the cationic polyacrylamide. That aldehyde is available for other reactions with a primary amide (from PAAm) or with a secondary amide (from PAE). When both aldehyde groups react with different amide groups, a crosslink is formed. corresponding sodium salts, complex calcium carbonate salts of organic acids (such as octanoic acid, iso-octanoic acid, 2-ethyl hexanoic acid, hexanoic acid, and the like) and other similar materials known in the art.

Another improvement to the stability of the GPAm resin can be obtained by adding one or more aldehyde scavengers to the GPAm resin or during the synthesis thereof. The stability of the glyoxalated polyacrylamide can depend, at least in part, on a balance between the free glyoxal in the composition and the reactive pendant aldehyde and other functional groups. To reduce the reactivity of the aldehyde and other functional groups, a mono-functional aldehyde scavenger material preferably of a low volatility can be used. Compounds with a single hydroxyl group such as lactic acid, malic acid, citric acid, choline chloride and the like can be used. Such aldehyde scavengers can be added in an amount to provide a molar ratio of the aldehyde scavenger to total glyoxal of about 0.0001:1 to bout 0.25:1.

Illustrative GPAm resins and methods for making same can include the glyoxalated polyacrylamide polymers discussed and described in U.S. Pat. Nos. 7,119,148; 7,488,403; 7,863,395; and 7,897,013.

Another exemplary PAE resin formed by reacting a polyamide having secondary amide groups with an excess of epichlorohydrin can have azetidinium cycles (cationic charges), chlorohydrin pendant groups, and/or some chlorohydrin involved in crosslinking is illustrated in chemical formula (O).

(O)

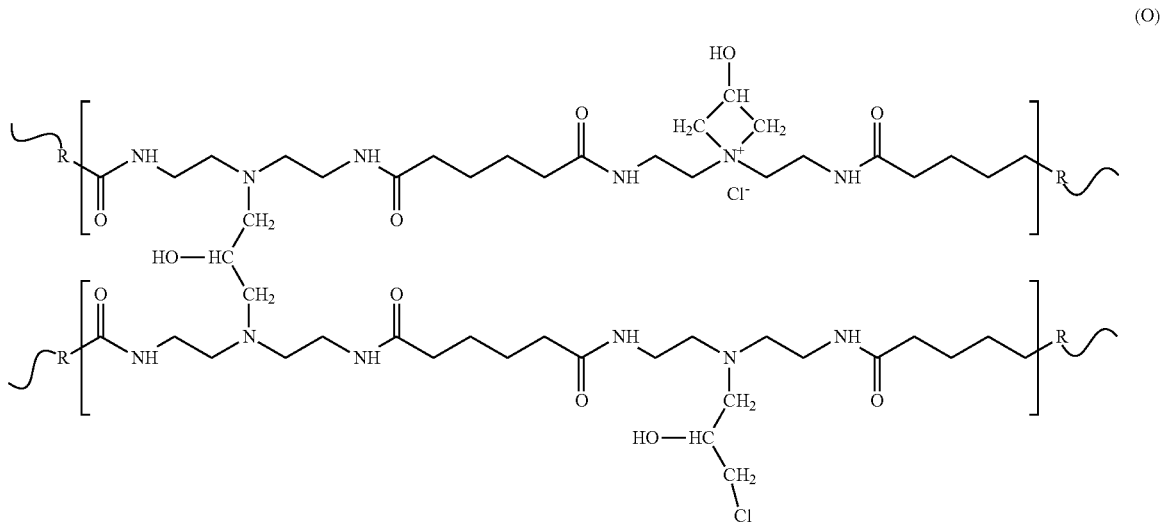

In the chemical formula (O), each R can independently be a hydrogen, a hydrocarbon, or a substituted hydrocarbon. An exemplary GPAm resin formed by glyoxalating a base polyacrylamide formed by reacting acrylamide as the base acrylamide monomer and DADMAC as the cationic co-monomer is illustrated in chemical formula (P). The DADMAC can cyclo-polymerize and the glyoxal can react

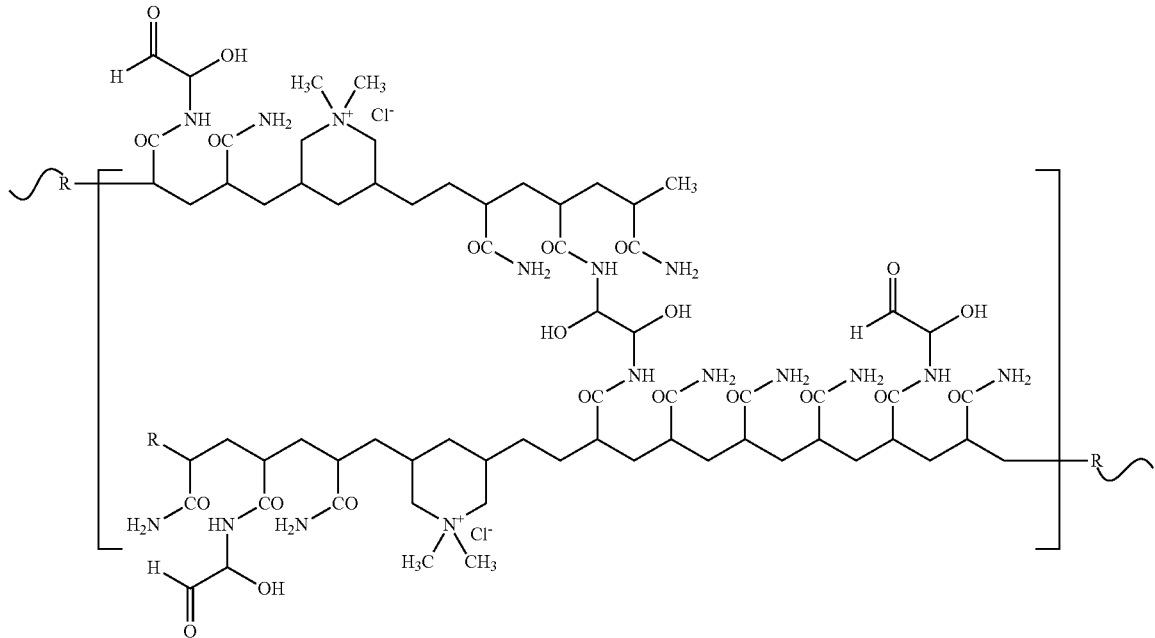

(P)

In the chemical formula (P), each R can independently be a hydrogen, a hydrocarbon, or a substituted hydrocarbon. A blend of the PAE resin of chemical formula (O) and the GPAm resin of chemical formula (P) can crosslink through glyoxal pendant groups from GPAm as shown in the chemical formula (Q).

In the chemical formula (Q), each R can independently be a hydrogen, a hydrocarbon, or a substituted hydrocarbon.

Another exemplary PAE resin formed by reacting a polyamide having secondary amide groups with N,N'-methylene-bis-acrylamide as a symmetric crosslinker to produce a partially crosslinked polyamine and reacting the partially

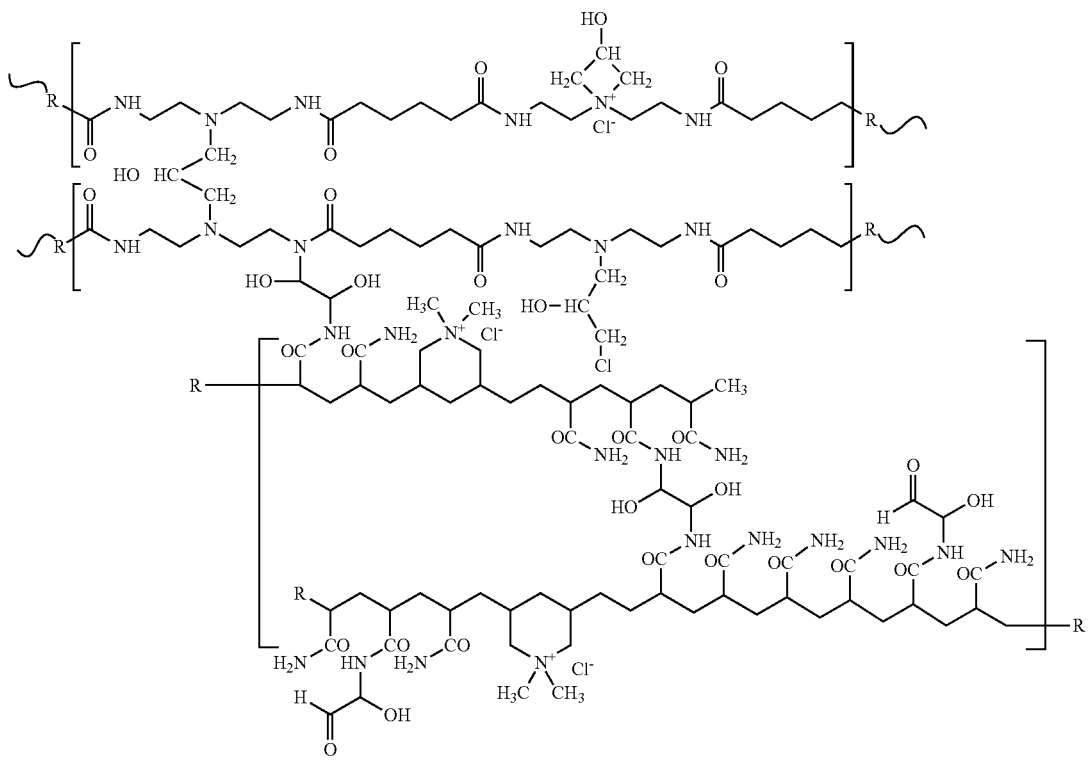

(Q)

crosslinked polyamine with epichlorohydrin can have azetidinium cycles (cationic charges) and/or chlorohydrin pendant groups is illustrated in chemical formula (R).

Conditioning the mixture can also include adjusting the pH of the mixture that includes the fibers and the PAE resin and/or the GPAm resin. The pH of the mixture that includes

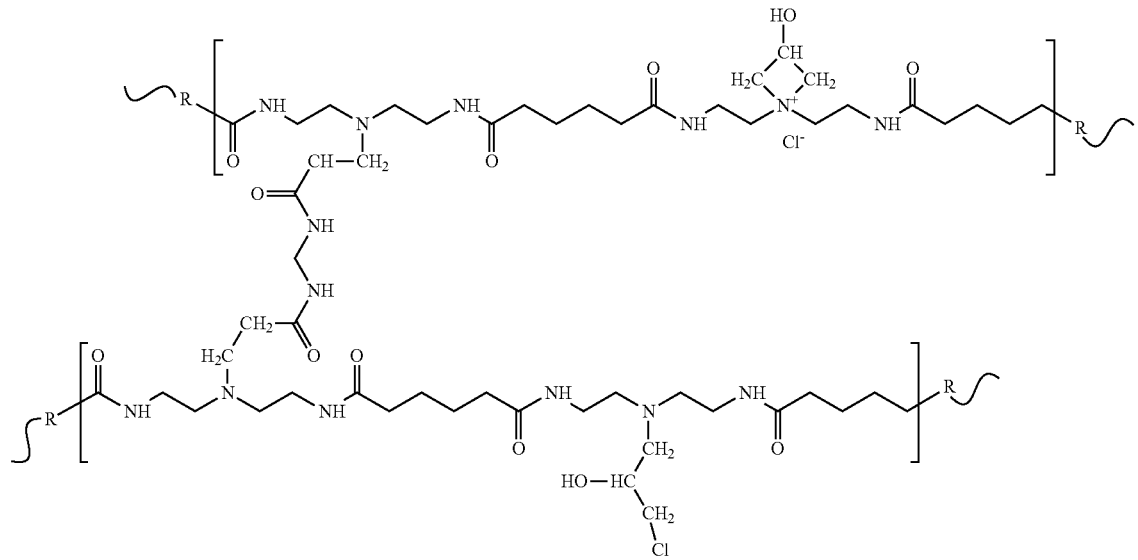

In the chemical formula (R), each R can independently be a hydrogen, a hydrocarbon, or a substituted hydrocarbon.

In at least one example, a method for making strengthened fiber or paper products can include combining fibers (e.g., cellulosic fibers and/or other types of fibers), the PAE resin, and the GPAm resin to produce a mixture. The PAE resin and the GPAm resin can be added to an aqueous suspension containing the fibers in any order. For example, the PAE resin and the GPAm resin can be added sequentially or simultaneously with respect to one another. In at least one example, the method can include adding the PAE resin to an aqueous suspension containing the fibers, and subsequently adding the GPAm resin to the aqueous suspension to produce the mixture containing the fibers, the PAE resin, and the GPAm resin. For example, the PAE resin can be added to the aqueous suspension containing the fibers first, and after the addition of the PAE resin, the GPAm resin can be added to the aqueous suspension to produce the mixture. In another example, the method can include adding the GPAm resin the aqueous suspension containing fibers, and after the addition of the GPAm resin, the PAE resin can be added to the aqueous suspension to produce the mixture.

The mixture that includes the fibers, the PAE resin, and the GPAm resin can be conditioned for a predetermined period of time during and between the steps of combining the components thereof. Conditioning can include, but is not limited to, agitating the mixture or a partial mixture, e.g., the fibers and the PAE resin, for a predetermined period of time prior to subjecting the fiber mixture to one or more separation processes. For example, the fiber mixtures containing the fibers, the PAE resin, and the GPAm resin can be stirred, blended, mixed, or otherwise agitated for a time from about 30 seconds, about 1 minute, about 2 minutes, about 3 minutes, or about 4 minutes to about 5 minutes, about 10 minutes, about 15 minutes, about 20 minutes, about 30 minutes, about 1 hour, or about 24 hours. Conditioning the mixtures can also include heating and/or cooling the fiber mixtures to a temperature from about 1° C., about 20° C., or about 35° C. to about 60° C., about 80° C., or about 95° C.

the fibers and the PAE resin and/or the GPAm resin can be about 2, about 3, about 4, or about 5 to about 8, about 9, about 10, about 11, or about 12. Any one or more acid compounds and/or base compounds can be combined with the mixtures to adjust the pH thereof. Illustrative acid compounds that can be used to adjust the pH value of any of the mixtures containing the fibers, the PAE resin, and/or the GPAm resin can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bisulfate, sodium metabisulfite, or any combination thereof.

Illustrative base compounds that can be used to adjust the pH value of any of the mixtures containing the fibers, the PAE resin, and/or the GPAm resin can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

In one or more examples, a fiber web (e.g., cellulosic fiber web) and/or the fibers (e.g., cellulosic fibers) can include at least one material selected from bleached furnish, softwood, hardwood, paper pulp, mechanical pulp, or any mixture thereof. The terms "cellulosic," "cellulosic sheet," "cellulosic fiber," "cellulosic fiber web," "fiber," "fiber web," and the like, are meant to include any product incorporating papermaking fibers having cellulose as a major constituent. "Papermaking fibers" can include virgin pulps, recycled (e.g., secondary) cellulosic fibers, or fiber mixtures containing virgin cellulosic fibers and/or reconstituted cellulosic fibers. Illustrative fibers that can be used to make or form fibrous webs, fibrous sheets, paper products, paper sheets, and other products can include: non-wood fibers, such as cotton fibers or cotton derivatives, abaca, kenaf, sabai grass, flax, esparto grass, straw, jute hemp, bagasse, milkweed floss fibers, and pineapple leaf fibers; and wood fibers, such as those obtained from deciduous and coniferous trees, including softwood fibers, such as Northern and Southern softwood Kraft fibers; hardwood fibers, such as eucalyptus, maple, birch, aspen, as well as a mixture or combination of softwoods and hardwoods, for example, a bleached furnish (60% hardwood and 40% softwood, by weight). Papermaking fibers can include naturally-occurring, pulp-derived fibers as well as reconstituted cellulosic fibers, such as lyocell or rayon. Papermaking fibers can be liberated from their source material by any one of a number of chemical pulping processes familiar to one experienced in the art, including: sulfate, sulfite, polysulfide, soda pulping, as well as other processes. The pulp can be bleached by chemical means including, but not limited to, the use of chlorine, chlorine dioxide, oxygen, ozone, hydrogen peroxide, alkaline peroxide, rear earth peroxides, as well as other compounds. Naturally-occurring, pulp-derived are referred to herein simply as "pulp-derived" papermaking fibers. The fiber or paper products described herein can include a blend of conventional fibers, whether derived from virgin pulp or recycled sources, and high coarseness lignin-rich tubular fibers, such as bleached chemical thermomechanical pulp (BCTMP). Pulp-derived fibers can also include high yield fibers such as BCTMP and thermomechanical pulp (TMP), chemithermomechanical pulp (CTMP), and alkaline peroxide mechanical pulp (APMP). Recycled fibers can be relatively shorter, stiffer, curlier, and more brittle than virgin fibers. Dewatering tests can assess fines content and the degree of external fibrillation. The dewatering tests can measure how easily water drains from the papermaking pulp. The Schopper-Riegler (SR) number or Canadian Standard Freeness (CSF) are the most common dewatering tests. The SR number can increase with beating and fines content, and the CSF can decrease with beating and fines content.

One or more fiber sheets (e.g., cellulosic fiber sheets) can be formed from the fibers and the fiber sheet can be contacted with the resin composition so that the fiber sheets includes at least the fibers, the PAE resin, and the GPAm resin. In another example, the fibers (e.g., cellulosic fibers) can be contacted with the resin composition and the fiber sheet can be formed from the fiber and resin mixture. The resin composition in the formed fiber sheet can be at least partially cured to produce a strengthened fiber product. Illustrative fiber products can include, but are not limited to, paper, paperboard, tissue paper, and paper towels.

In some examples, the fiber sheets can be formed by passing the fiber mixture through a sheet former, applying pressure to the fiber sheets, and drying the fiber sheets. For example, the fiber sheets can be formed from the fiber mixture by a Noble & Wood sheet former. The fiber sheets can be pressed with at least one blotter, but generally between two blotters subsequent to being formed by the sheet former. The fiber sheets can be pressed at a pressure of about 35 Pa to about 345 kPa, about 69 Pa to about 210 kPa, or about 100 kPa to about 175 kPa. For example, the fiber sheets can be pressed at a pressure of about 138 kPa. Also, the fiber sheets can be pressed for about 5 seconds to about 1 minute, or longer depending on the desired product.

The fiber sheets can be dried by heating the fiber sheets at a drying temperature with a sheet dryer. For example, the fiber sheets can be dried on an Adirondack dryer with one pass or multiple passes of the fiber sheets. The dryer can be a belt-driven and fabric-covered dryer. The drying temperature can be about 50° C. to about 200° C., about 100° C. to about 150° C., or about 110° C. to about 140° C. For example, the drying temperature can be about 115° C. or about 130° C. Generally, the fiber sheets can be dried for about 20 seconds to about 3 minutes.

In at least one example, the resin composition that includes the mixture of the PAE resin and the GPAm resin in the fiber sheet can be at least partially cured at a predetermined temperature for a predetermined time to produce the strengthened fiber product. In one example, the resin composition in the fiber sheets can be cured in a forced-air, convection oven. The curing temperature can be about 80° C. to about 120° C., about 90° C. to about 115° C., or about 100° C. to about 110° C. to form the fiber product. For example, the curing temperature can be about 105° C. to form the fiber product. Also, the curing time can be about 2 minutes to about 20 minutes, about 2 minutes to about 10 minutes, or about 3 minutes to about 8 minutes. For example, the curing time can be about 5 minutes. In some examples, the resin composition in the fiber sheets can be cured at a curing temperature of about 90° C. to about 115° C., and for a curing time of about 3 minutes to about 10 minutes to form or produce the fiber product.

The amount of the resin composition combined with the fibers to produce the mixture of the fibers, the PAE resin, and the GPAm resin can be about 0.05 wt %, about 0.1 wt %, about 0.2 wt %, about 0.3 wt %, or about 0.5 wt % to about 3 wt %, about 4 wt %, about 5 wt %, or about 7 wt %, based on a dried weight of the strengthened fiber product. As such, the resin composition can be present in the strengthened fiber product, e.g., a paper product, in an amount of about 0.05 wt % to about 5 wt %, about 0.1 wt % to about 2 wt %, about 0.2 wt % to about 1.8 wt %, or about 0.3 wt % to about 1.2 wt %, based on a dried weight of the strengthened fiber product. For example, the resin composition can be present in the strengthened fiber or the paper product in an amount of about 0.6 wt %, based on a dried weight of the strengthened fiber product.

EXAMPLES

In order to provide a better understanding of the foregoing discussion, the following non-limiting examples are offered. Although the examples can be directed to specific embodiments, they are not to be viewed as limiting the invention in any specific respect.

One of the synergetic effects of a resin composition that included a blend of a GPAm resin and a PAE resin is highlighted by the results shown in Tables 1 and 2 below. Two comparative resin compositions (C1 and C2) and two inventive resin compositions (Ex. 1 and Ex. 2) were prepared and the viscosities of the resin compositions were measured over time. The blended resins were maintained at a temperature of about 25° C. throughout the viscosity measurements.

Preparation of Standard Wet Strength Resin (Resin A).

A glass reactor with a 5-neck top was equipped with a stainless steel stirring shaft, a reflux condenser, temperature probe, and a hot oil bath. For the synthesis of the polyamidoamine prepolymer, to the reactor was added about 436 grams of DETA (diethylenetriamine). The stirrer was turned on and about 636 grams of adipic acid was added slowly to the reactor over about 45 minutes with stirring. The reaction temperature increased from about 25° C. to about 140° C. during the addition of the adipic acid. After the adipic acid addition was complete, the reactor was immersed in a hot oil bath heated to a temperature of about 165° C. At about 150° C. the reaction mixture began to reflux. The reflux condenser was reconfigured for distillation, and distillate was collected in a separate receiver. The reaction mixture was sampled at about 30 minute intervals. Each sample was diluted with water to a solids content of about 45% and the viscosity was measured with Brookfield viscometer at a temperature of about 25° C. When the sample reached a viscosity of about 290 cP the distillation condenser was reconfigured to reflux. Water was added slowly to the reaction mixture through the reflux condenser to dilute and cool the reaction. Water was added to obtain final solids content of about 45%. The viscosity was 290 cP at a temperature of about 25° C.

A glass reactor with 5-neck top was equipped with a stirrer, an equal pressure addition funnel, temperature and pH probe, stainless steel cooling coils, sample valve, and heating mantle. To the reactor was added about 359 grams of the polyamidoamine prepolymer that had a solids content of about 45% obtained according to this example. The reaction temperature was adjusted to about 25° C. and about 25 grams of water was added. Then, about 92 grams of epichlorohydrin was added at a temperature of about 25° C. over a time period of about 72 minutes. About 387 grams of water was added to the reaction mixture. The reaction mixture was heated to a temperature of about 55° C. until the viscosity increased to about 320 cP. The reaction mixture was adjusted to have a solids content of about 25%, a pH of about 3, and a viscosity of about 172 cP at a temperature of about 25° C.

Preparation of Polyamidoamine Prepolymer I.

A glass reactor with a 5-neck top was equipped with a stainless steel stirring shaft, a reflux condenser, temperature probe, and a hot oil bath was provided. To the reactor was added about 500.5 grams of diethylenetriamine (DETA). The stirrer was turned on and about 730 grams of adipic acid was slowly added to the reactor over a time period of about 45 minutes with stirring. The reaction temperature increased from about 25° C. to about 145° C. during addition of the adipic acid. After the adipic acid addition was complete, the reactor was immersed in a hot oil bath heated to a temperature of about 160° C. At a temperature of about 150° C. the reaction mixture began to reflux. The reflux condenser was reconfigured for distillation and distillate was collected in a separate receiver. The reaction mixture was sampled at about 30 minute intervals. Each sample was diluted with water to a solids content of about 45% and the viscosity was measured with Brookfield viscometer at a temperature of about 25° C. When the sample reached a viscosity of about 290 cP the distillation condenser was reconfigured to reflux. Water was slowly added to the reaction mixture through the reflux condenser to dilute and cool the reaction. Water was added to obtain a final solids content of about 45%. The viscosity was about 290 cP at a temperature of about 25° C.

Preparation of Polyamidoamine Prepolymer II.

A glass reactor with a 5-neck top was equipped with a stainless steel stirring shaft, a reflux condenser, temperature probe, and a hot oil bath was provided. To the reactor was added about 1,574.5 grams of DBE-5 dibasic ester (glutaric acid dimethyl ester). The stirrer was turned on and about 1,038.9 grams of DETA was added to the reactor with stirring. The reactor was immersed in a hot oil bath and heated to a temperature of about 100° C. At a temperature of about 90° C. the reaction mixture began to reflux. The reflux condenser was reconfigured for distillation and distillate was collected in a separate receiver. The reaction mixture was sampled at about 30 minute intervals. Each sample was diluted with water to a solids content of about 45% and the viscosity was measured with Brookfield viscometer at a temperature of about 25° C. When the sample reached a viscosity of about 220 cP the distillation condenser was reconfigured to reflux. Water was slowly added to the reaction mixture through the reflux condenser to dilute and cool the reaction. Water was added to obtain a final solids content of about 45%. The viscosity was about 220 cP at a temperature of about 25° C.

Preparation of a Wet Strength Resin from the Prepolymer I (Resin B).

A glass reactor with 5-neck top was equipped with a glass stirring shaft and Teflon paddle, an equal pressure addition funnel, temperature and pH probe, stainless steel cooling coils, sample valve, and heating mantle. To the reactor was added about 1,000 grams of the Polyamidoamine Prepolymer I from Example 1. The stirrer was started and the prepolymer was heated to a temperature of about 40° C. N, N-Methylene-bis-acrylamide, about 15.16 grams (Pfaltz & Bauer, Inc), was slowly added while the reaction mixture was heated to a temperature of about 60° C. The reaction mixture was held at a temperature of about 60° C. for about 2 hours and the viscosity advanced to about 4,630 cP (Brookfield-SSA), at which point the viscosity advancement stopped. The reaction mixture was cooled to a temperature of about 25° C. The intermediate (partially cross-linked) prepolymer was isolated and stored.

To the reactor was added about 366.04 grams of the intermediate (partially cross-linked) prepolymer. The reaction temperature was adjusted to about 25° C. and about 120.13 grams of water was added. The viscosity of the reaction mixture was about 837 cP. To the intermediate partially cross-linked prepolymer was added about 77.89 grams of epichlorohydrin at a temperature of about 25° C. over a time period of about 90 minutes. About 428.19 grams of water was added to the reaction mixture. The reaction mixture was held at a temperature of about 25° C. for about 18 hours while sampling periodically for $^{13}$C NMR analysis. During this time the viscosity of the reaction increased from about 18 cP to about 319 cP (Brookfield-SSA). This reaction mixture was treated with concentrated sulfuric acid to adjust the pH to about 2.94. Water was added to obtain a final solids content of about 25%. The viscosity of was about 335 cP at a temperature of about 25° C.

Preparation of a Wet Strength Resin from the Prepolymer II (Resin C).

A glass reactor with 5-neck top was equipped with a glass stirring shaft and Teflon paddle, an equal pressure addition funnel, temperature and pH probe, stainless steel cooling coils, sample valve, and heating mantle. To the reactor was added about 445.64 grams of Polyamidoamine Prepolymer II from Example 2. About 5.25 grams of water was added and the stirrer was started. The reaction mixture was heated to a temperature of about 35° C. and about 2.028 grams of N, N-methylene-bis-acrylamide (Pfaltz & Bauer, Inc.) was added. The reaction mixture was heated to a temperature of about 60° C. and held at that temperature for about 4 hours. The viscosity of the reaction mixture advanced to produce an intermediate (partially crosslinked) prepolymer that had a viscosity of about 384 cP (Brookfield-SSA).

The reaction temperature of the intermediate (partially crosslinked) prepolymer was adjusted to about 25° C. and about 88.46 grams of water was added. The reaction temperature was adjusted to about 21° C. and about 121.21 grams of epichlorohydrin was added over a time period of about 75 minutes. This reaction mixture was allowed to warm to a temperature of about 25° C. over a time period of about 45 minutes and about 446.27 grams of water was added. This reaction mixture was heated to a temperature of about 45° C. and after about 2 hours was heated to a temperature of about 55° C. After about 4 hours, a mixture of formic acid and sulfuric acid was added to adjust the pH to about 2.87. The reaction mixture was cooled to a temperature of about 25° C. and water was added to adjust the solids content to about 25%. The viscosity of the resultant wet strength resin was 187 cP at a temperature of about 25° C.

Preparation of Polyacrylamide Base Polymer 1.

A suitable 2 liter glass reactor was fitted with a stirring apparatus, thermometer, a nitrogen inlet, a condenser and placed in heating bath. The reactor was charged with about 320 g of water, about 120 g of a DADMAC solution (63% concentration), about 122 g of an acrylamide solution (50% concentration) and about 1 g of 2-mercaptoethanol. The reactor was heated to a temperature of about 80° C. at which time the acrylamide monomer feed (about 878 g of acrylamide and about 7 g of 2-mercaptoethanol) and the initiator solution feed (about 5 g of ammonium persulfate in about 150 g of water) were initiated and continuously added to the reactor. The initiator solution flow rate was constant and the addition time was about 190 minutes. The acrylamide monomer solution was added initially at a slow flow rate (about 285 g in the first 120 minute) and then with a high flow rate (about 600 g in about 60 minutes). The total addition time for the acrylamide monomer solution was 180 minutes. After the addition of the initiator solution was completed, the temperature was maintained at about 80° C. for about 30 minutes. To lower the un-reacted acrylamide concentration t-butyl hydroperoxide (about 0.7 g of a 70% solution) and sodium formaldehyde sulfoxylate (about 0.3 g) were added. The final solution had a solids content of about 40.2%, a pH of about 3.3, and a viscosity of about 674 cPs at a temperature of about 25° C.

Preparation of Polyacrylamide Base Polymer 2.

A suitable 2 liter glass reactor was fitted with a stirring apparatus, thermometer, a nitrogen inlet, a condenser and then placed in heating bath. The reactor was charged with about 400 g of water, about 215 g of acrylamide solution (about 50% concentration), and about 16 g of diethylenetriamine (DETA). An exothermic reaction developed. The reactor was kept at a temperature of about 35° C. for about 15 minutes. The pH of the reaction mixture was adjusted to about 3.5 with about 20 g of a sulfuric acid solution 98%, and then about 125 g of a DADMAC, solution (63% concentration), about 14 g of hydroxyethyl acrylate (HEA), and about 8 g of 2-mercaptoethanol was added. The reactor was heated to a temperature of about 80° C. at which time the acrylamide monomer feed (about 700 g of acrylamide, about 46 g of HEA and about 36 g of 2-mercaptoethanol) and the initiator solution feed (about 3.2 g of ammonium persulfate in about 125 g water) were initiated and continuously added to the reactor. The initiator solution flow rate was constant over an addition time of about 190 minutes. The acrylamide monomer solution was initially added at a slow flow rate (about 350 g in the first 120 minutes) and then at a higher flow rate (about 432 g in 60 minutes). The total addition time for the acrylamide monomer solution was about 180 minutes. After the addition of the initiator solution was completed, the temperature was maintained at about 80° C. for an additional 30 minutes. To lower the un-reacted acrylamide concentration t-butyl hydroperoxide (about 0.7 g of a 70% solution) and sodium formaldehyde sulfoxylate (about 0.3 g) were added. The final solution had a solids content of about 40.1%, a pH of about 3.3, and a viscosity of about 21.6 cPs at 25° C.

Preparation of Glyoxalated Polyacrylamide from Base Polymer 1 (Resin D).

To a one-liter glass reactor equipped with condenser, stirrer and a jacketed connection to a circulated constant temperature water bath was added about 93.6 g of the base polymer 1, about 253.8 g of water, about 29.7 g of a 40 wt % glyoxal aqueous solution, and about 30.1 g of a sodium phosphate buffer solution (pH of about 7.6 and about 7.3% concentration). The temperature was set to about 30° C. The pH was adjusted to about 7.6 by the addition of about 9.5 g of a 3% sodium hydroxide solution. The pH of the solution was maintained at about 7.6 by continuously adding about 0.3% sodium hydroxide. When the viscosity of the reaction solution reached about 20 cPs, the pH was lowered to about 6.6 by adding about 1.06 g of a 35 wt % sulfuric acid aqueous solution to slow the rate of the glyoxalation reactions. When the polymer reaction solution reached a viscosity of about 36 cPs, the pH was lowered further to about 3.3 with about 2.14 g of the 35% weight sulfuric acid solution. A sodium citrate buffer solution (pH of about 3.3 and about 15% concentration) was added in an amount of about 35.4 g. Then, about 7.8 g of a 40% glyoxal solution was post-added. Dilution water was added to adjust the final solids content to about 12.5%. The resulting resin had a pH of about 3.25 and a viscosity of about 22.9 cPs at a temperature of about 25° C.

Preparation of Glyoxalated Polyacrylamide from Base Polymer 2 (Resin E).

To 1 liter glass reactor equipped with condenser, stirrer and a jacketed connection to a circulated constant temperature water bath, was added about 191.2 g of the polyacrylamide base polymer 2, about 59.6 g of water, and about 37.9 g of a 40% weight glyoxal aqueous solution. The temperature was set to about 30° C. The pH was adjusted to about 8 by the addition of about 50 g of 1N hydroxide solution. The pH of the solution was maintained at about 8 by continuously adding about 95 g of 0.1N sodium hydroxide. As soon as the viscosity of the reaction solution reached about 25 cPs, the addition of the sodium hydroxide solution was discontinued. Then, the pH was lowered to about 7.2 by adding about 0.6 g of a 35% weight sulfuric acid aqueous solution to slow the rate of the glyoxalation reactions. When the polymer reaction solution reached a viscosity of about 58 cPs, the pH was lowered to about 3.3 with about 13.7 g of a 35% weight sulfuric acid solution. A sodium citrate buffer solution (pH of about 3.3 and about 16% concentration) was added in an amount of about 26.5 g. Then, about 1.8 g of a 40% glyoxal solution was post-added. Dilution water (about 23.8 g) was added to adjust the final solids content to about 20% by weight. The resulting resin had a pH of about 3.35 and a viscosity of about 21.9 cPs at a temperature of about 25° C.

Comparative Example C1: Blend of the Standard Wet Strength Resin and the Glyoxalated Polyacrylamide Prepared from the Base Polymer 1 (Resin A+Resin D)

The Standard Wet Strength Resin and the Glyoxalated Polyacrylamide prepared from Base Polymer 1 were blended at a ratio of about 1:1, based on a dry weight of the polymers at room temperature. The blend had a solids content of about 18.75%. A stop watch was used to track elapsed time as soon as the two components were combined by simple blending. Viscosity was tracked using a Brookfield DV-II+ viscometer equipped with a small sample adapter and a #18 spindle. All measurements were made at 5 rpm to avoid shifts in scale when changing speeds on the viscometer.

Example 1: Blend of the Wet Strength Resin Prepared from the Prepolymer I and the Glyoxalated Polyacrylamide Prepared from the Base Polymer 1 (Resin B+Resin D)

The Wet Strength Resin prepared from the Prepolymer I and the Glyoxalated Polyacrylamide prepared from the Base Polymer 1 were blended at a ratio of about 1:1, based on dry weight of polymer at room temperature. The blend had a solids content of about 18.75%. A stop watch was used to track elapsed time as soon as the two components were combined by simple blending. Viscosity was tracked using a Brookfield DV-II+ viscometer equipped with a small sample adapter and a #18 spindle. All measurements were made at 5 rpm to avoid shifts in scale when changing speeds on the viscometer.

Comparative Example C2: Blend of the Standard Wet Strength Resin and the Glyoxalated Polyacrylamide Prepared from the Base Polymer 2 (Resin A+Resin E)

The Standard Wet Strength Resin and the Glyoxalated Polyacrylamide prepared from the Base Polymer 2 were blended at a ratio of about 1:1, based on dry weight of polymer at room temperature. The blend had a solids content of about 22.5%. A stop watch was used to track elapsed time as soon as the two components were combined by simple blending. Viscosity was tracked using a Brookfield DV-II+ viscometer equipped with a small sample adapter and a #18 spindle. All measurements were made at 5 rpm to avoid shifts in scale when changing speeds on the viscometer.

Example 2: Blend of the Wet Strength Resin Prepared from the Prepolymer I and the Glyoxalated Polyacrylamide Prepared from the Base Polymer 2 (Resin B+Resin E)

The Wet Strength Resin prepared from the Prepolymer I and the Glyoxalated Polyacrylamide prepared from the Base Polymer 2 were blended at a ratio of about 1:1, based on dry weight of polymer at room temperature. The blend had a solids content of about 22.5%. A stop watch was used to track elapsed time as soon as the two components were combined by simple blending. Viscosity was tracked using a Brookfield DV-II+ viscometer equipped with a small sample adapter and a #18 spindle. All measurements were made at 5 rpm to avoid shifts in scale when changing speeds on the viscometer.

TABLE 1

| | C1 (Resin A + Resin D) | | Ex. 1 (Resin B + Resin D) | |
|---|---|---|---|---|
| Time | Viscosity (cPs) | Increase in viscosity (%) | Viscosity (cPs) | Increase in viscosity (%) |
| 0 | 67 | 0 | 62 | 0 |
| 5 | 79 | 17.91 | 83 | 33.87 |
| 10 | 88 | 31.34 | 97 | 56.45 |
| 15 | 94 | 40.30 | 106 | 70.97 |
| 20 | 98 | 46.27 | 113 | 82.26 |
| 25 | 100 | 49.25 | 118 | 90.32 |
| 30 | | | 122 | 96.77 |
| 35 | | | 125 | 101.61 |

TABLE 2

| | C2 (Resin A + Resin E) | | Ex. 2 (Resin B + Resin E) | |
|---|---|---|---|---|
| Time | Viscosity (cPs) | Increase in viscosity (%) | Viscosity (cPs) | Increase in viscosity (%) |
| 0 | 86 | 0 | 79 | 0 |
| 5 | 111 | 29.07 | 153 | 93.67 |
| 10 | 128 | 48.84 | 204 | 158.23 |
| 15 | 141 | 63.95 | 250 | 216.46 |
| 20 | 150 | 74.42 | 285 | 260.76 |
| 25 | 157 | 82.56 | 334 | 322.78 |
| 30 | 160 | 86.05 | 415 | 425.32 |
| 35 | 163 | 89.53 | | |

As shown in Tables 1 and 2, the viscosity of the two inventive examples (Ex. 1 and Ex. 2) significantly increased over time as compared to the comparative examples (C1 and C2). Without wishing to be bound by theory, it is believed that the observed increase in viscosity over time for Examples 1 and 2, as compared to comparative examples C1 and C2, can be explained by the formation of crosslinks between the GPAm resin and PAE resin through glyoxal pendant groups of the GPAm, as shown in chemical formula (Q) above. The significant increase in viscosity over time for Examples 1 and 2, as compared to comparative examples C1 and C2 was surprising and unexpected.

Embodiments of the present disclosure further relate to any one or more of the following paragraphs:

1. A resin composition comprising a glyoxalated polyacrylamide resin and a polyamide-epihalohydrin resin, wherein the polyamide-epihalohydrin resin is prepared by a process comprising: producing a partially crosslinked polyamine by reacting a polyamine and a functionally symmetric crosslinker; producing a halohydrin-functionalized polymer by reacting the partially crosslinked polyamine and an epihalohydrin; and producing the polyamide-epihalohydrin resin by cyclizing the halohydrin-functionalized polymer to form azetidinium ions.

2. A method for making a fiber product, comprising: combining a resin composition with a plurality of fibers to produce a mixture, wherein the resin composition comprises a glyoxalated polyacrylamide resin and a polyamide-epihalohydrin resin, wherein the polyamide-epihalohydrin resin is prepared by a process comprising: producing a partially crosslinked polyamine by reacting a polyamine and a functionally symmetric crosslinker; producing a halohydrin-functionalized polymer by reacting the partially crosslinked polyamine and an epihalohydrin; and producing the polyamide-epihalohydrin resin by cyclizing the halohydrin-functionalized polymer to form azetidinium ions; and at least partially curing the resin composition to produce a fiber product.

3. A fiber product, comprising: a plurality of fibers; and an at least partially cured resin composition, wherein, prior to curing, the resin composition comprises a glyoxalated polyacrylamide resin and a polyamide-epihalohydrin resin, and wherein the polyamide-epihalohydrin resin is prepared by a process comprising: producing a partially crosslinked polyamine by reacting a polyamine and a functionally symmetric crosslinker; producing a halohydrin-functionalized polymer by reacting the partially crosslinked polyamine and an epihalohydrin; and producing the polyamide-epihalohydrin resin by cyclizing the halohydrin-functionalized polymer to form azetidinium ions.

4. A resin composition comprising a glyoxalated polyacrylamide resin and a polyamide-epihalohydrin resin, wherein the polyamide-epihalohydrin resin is prepared by a process comprising: reacting a polyamine and a functionally symmetric crosslinker to produce a partially crosslinked polyamine; reacting the partially crosslinked polyamine and an epihalohydrin to produce a halohydrin-functionalized polymer; and cyclizing the halohydrin-functionalized polymer to form azetidinium ions to produce the polyamide-epihalohydrin resin.

5. A method for making a fiber product, comprising: combining a resin composition with a plurality of fibers to produce a mixture, wherein the resin composition comprises a glyoxalated polyacrylamide resin and a polyamide-epihalohydrin resin, wherein the polyamide-epihalohydrin resin is prepared by a process comprising: reacting a polyamine and a functionally symmetric crosslinker to produce a partially crosslinked polyamine; reacting the partially crosslinked polyamine and an epihalohydrin to produce a halohydrin-functionalized polymer; and cyclizing the halohydrin-functionalized polymer to form azetidinium ions to produce the polyamide-epihalohydrin resin; and at least partially curing the resin composition to produce a fiber product.

6. A fiber product, comprising: a plurality of fibers; and an at least partially cured resin composition, wherein, prior to curing, the resin composition comprises a glyoxalated polyacrylamide resin and a polyamide-epihalohydrin resin, and wherein the polyamide-epihalohydrin resin is prepared by a process comprising: reacting a polyamine and a functionally symmetric crosslinker to produce a partially crosslinked polyamine; reacting the partially crosslinked polyamine and an epihalohydrin to produce a halohydrin-functionalized polymer; and cyclizing the halohydrin-functionalized polymer to form azetidinium ions to produce the polyamide-epihalohydrin resin.

7. The resin composition, method, or fiber product according to any one of paragraphs 1 to 6, wherein the polyamide-epihalohydrin resin has a ratio of azetidinium ions to amide residues of about 0.4 to about 1.3.

8. The resin composition, method, or fiber product according to any one of paragraphs 1 to 7, wherein the polyamide-epihalohydrin resin has a weight average molecular weight of about 20,000 to about 3,000,000.

9. The resin composition, method, or fiber product according to any one of paragraphs 1 to 8, wherein the polyamide-epihalohydrin resin has a ratio of azetidinium ions to amide residues of about 0.5 to about 0.9.

10. The resin composition, method, or fiber product according to any one of paragraphs 1 to 9, wherein the polyamide-epihalohydrin resin has a charge density of about 1 mEq/g of solids to about 4 mEq/g of solids.

11. The resin composition, method, or fiber product according to any one of paragraphs 1 to 10, wherein the epihalohydrin comprises epichlorohydrin, epibromohydrin, epiiodohydrin, or any mixture thereof.

12. The resin composition, method, or fiber product according to any one of paragraphs 1 to 11, wherein the polyamine has a chemical formula:

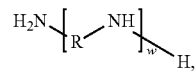

wherein R is a substituted or unsubstituted organic diyl group, and wherein w is an integer of 1 to about 10,000.

13. The resin composition, method, or fiber product according to any one of paragraphs 1 to 12, wherein the functionally symmetric crosslinker comprises a di-acrylate, a bis(acrylamide), a di-epoxide, N,N'-methylene-bis-acrylamide, N,N'-methylene-bis-methacrylamide, poly(ethylene glycol) diglycidyl ether, polypropylene glycol) diglycidyl ether, polyethylene glycol diacrylate, polyazetidinium compounds, or any mixture thereof.

14. The resin composition, method, or fiber product according to any one of paragraphs 1 to 13, wherein the functionally symmetric crosslinker comprises:

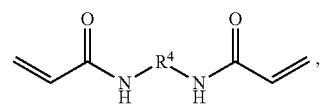

wherein $R^4$ is $(CH_2)_d$, wherein d is 1, 2, or 3.

15. The resin composition, method, or fiber product according to any one of paragraphs 1 to 14, wherein the functionally symmetric crosslinker comprises:

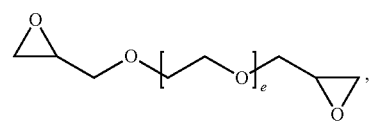

wherein e is from about 1 to about 100.

16. The resin composition, method, or fiber product according to any one of paragraphs 1 to 15, wherein the functionally symmetric crosslinker comprises:

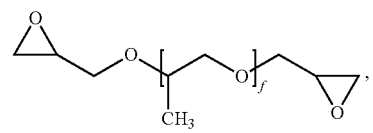

wherein f is from about 1 to about 100.

17. The resin composition, method, or fiber product according to any one of paragraphs 1 to 16, wherein the functionally symmetric crosslinker comprises:

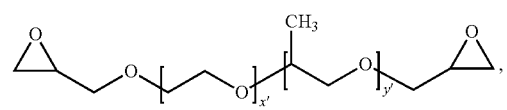

wherein x'+y' is from about 1 to about 100.

18. The resin composition, method, or fiber product according to any one of paragraphs 1 to 17, wherein the functionally symmetric crosslinker comprises:

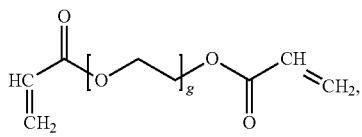

wherein g is from about 1 to about 100.

19. The resin composition, method, or fiber product according to any one of paragraphs 1 to 18, wherein the functionally symmetric crosslinker comprises:

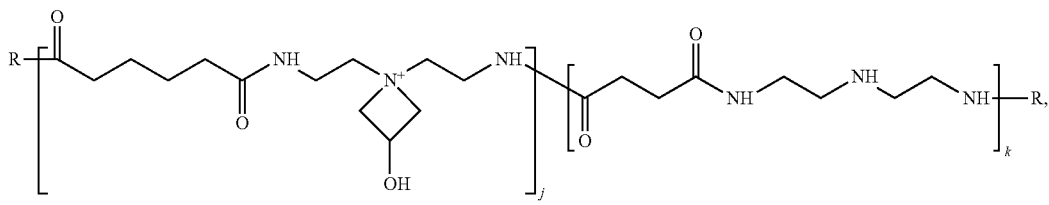

wherein a j/k ratio is from about 10 to about 1000.

20. The resin composition, method, or fiber product according to any one of paragraphs 1 to 19, wherein the functionally symmetric crosslinker comprises: a copolymer of an acrylate, a methacrylate, an alkene, or a diene, with an azetidinium-functionalized monomer selected from

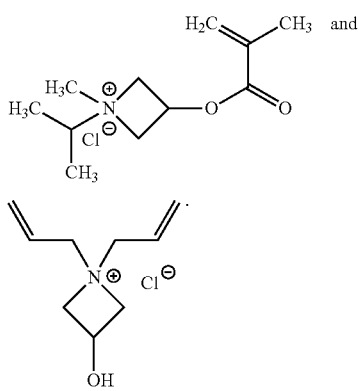

21. The resin composition, method, or fiber product according to any one of paragraphs 1 to 20, wherein the polyamine is further reacted with a mono-functional modifier prior to, during, or after reacting with the functionally symmetric crosslinker.

22. The resin composition, method, or fiber product according to any one of paragraphs 1 to 21, wherein the polyamine is further reacted with a mono-functional modifier prior to, during, or after reacting with the functionally symmetric crosslinker, and wherein the mono-functional modifier comprises an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, or any mixture thereof.

23. The resin composition, method, or fiber product according to any one of paragraphs 1 to 22, wherein the glyoxalated polyacrylamide resin is prepared by a process comprising: contacting a first amount of glyoxal with a base polyacrylamide having pendant amide groups to produce a first intermediate glyoxalated polyacrylamide; adding an acid to the intermediate glyoxalated polyacrylamide to produce a second intermediate glyoxalated polyacrylamide having a reduced pH as compared to the first intermediate glyoxalated polyacrylamide; and adding a second amount of glyoxal to the second intermediate glyoxalated polyacrylamide to produce the glyoxalated polyacrylamide.

24. The resin composition, method, or fiber product according to any one of paragraphs 1 to 23, wherein the resin composition has a solids content of about 1 wt % to about 80 wt %.

25. The resin composition, method, or fiber product according to any one of paragraphs 1 to 24, wherein the resin composition comprises about 1 wt % to about 99 wt % of the polyamide-epihalohydrin resin, based on a combined solids weight of the polyamide-epihalohydrin resin and the glyoxalated polyacrylamide resin.

26. The resin composition, method, or fiber product according to any one of paragraphs 1 to 25, wherein the polyamine has molecular weight of about 2,000 to about 1,000,000.

27. The resin composition, method, or fiber product according to any one of paragraphs 1 to 26, wherein the resin composition has an initial viscosity at a time the resin composition is prepared, and wherein about 5 minutes after the resin composition is prepared the resin composition has a second viscosity that is at least 20% greater than the initial viscosity.

28. The resin composition, method, or fiber product according to any one of paragraphs 1 to 27, wherein the resin composition has an initial viscosity at a time the resin composition is prepared, and wherein about 5 minutes after the resin composition is prepared the resin composition has a second viscosity that is at least 60% greater than the initial viscosity.

29. The resin composition, method, or fiber product according to any one of paragraphs 1 to 28, wherein the resin composition has an initial viscosity at a time the resin composition is prepared, and wherein about 5 minutes after the resin composition is prepared the resin composition has a second viscosity that is at least 80% greater than the initial viscosity.

30. The resin composition, method, or fiber product according to any one of paragraphs 1 to 29, wherein the resin composition has an initial viscosity at a time the resin composition is prepared, and wherein about 10 minutes after the resin composition is prepared the resin composition has a second viscosity that is at least 50% greater than the initial viscosity.

31. The resin composition, method, or fiber product according to any one of paragraphs 1 to 30, wherein the resin composition has an initial viscosity at a time the resin composition is prepared, and wherein about 15 minutes after the resin composition is prepared the resin composition has a second viscosity that is at least 60% greater than the initial viscosity.

32. The resin composition, method, or fiber product according to any one of paragraphs 1 to 31, wherein the resin composition has an initial viscosity at a time the resin composition is prepared, and wherein about 20 minutes after the resin composition is prepared the resin composition has a second viscosity that is at least 70% greater than the initial viscosity.

33. The resin composition, method, or fiber product according to any one of paragraphs 1 to 32, wherein the resin composition has an initial viscosity at a time the resin composition is prepared, and wherein about 25 minutes after the resin composition is prepared the resin composition has a second viscosity that is at least 80% greater than the initial viscosity.

34. The resin composition, method, or fiber product according to any one of paragraphs 1 to 33, wherein the resin composition has an initial viscosity at a time the resin composition is prepared, and wherein about 30 minutes after the resin composition is prepared the resin composition has a second viscosity that is at least 90% greater than the initial viscosity.

35. A resin composition comprising a glyoxalated polyacrylamide resin and a polyamide-epihalohydrin resin, wherein the polyamide-epihalohydrin resin comprises a polyamine partially crosslinked with a bridging moiety and having azetidinium ions, wherein the bridging moiety is derived from a functionally symmetric crosslinker.

36. A fiber product, comprising: a plurality of fibers; and an at least partially cured resin composition, wherein, prior to curing, the resin composition comprises a glyoxalated polyacrylamide resin and a polyamide-epihalohydrin resin, and wherein the polyamide-epihalohydrin resin comprises a polyamine partially crosslinked with a bridging moiety and having azetidinium ions, wherein the bridging moiety is derived from a functionally symmetric crosslinker.

37. A method for making a fiber product, comprising: combining a resin composition with a plurality of fibers to produce a mixture, wherein resin composition comprising a glyoxalated polyacrylamide resin and a polyamide-epihalohydrin resin, wherein the polyamide-epihalohydrin resin comprises a polyamine partially crosslinked with a bridging moiety and having azetidinium ions, wherein the bridging moiety is derived from a functionally symmetric crosslinker; and at least partially curing the resin composition to produce a fiber product.

38. The resin composition, fiber product, or method according to any one of paragraphs 35 to 37, wherein the resin composition has a solids content of about 15 wt % to about 40 wt %.

39. The resin composition, fiber product, or method according to any one of paragraphs 35 to 38, wherein the resin composition has a solids content of about 20 wt % to about 30 wt %.

40. The resin composition, fiber product, or method according to any one of paragraphs 35 to 39, wherein the resin composition comprises about 5 wt % to about 95 wt % of the polyamide-epihalohydrin resin, based on a combined solids weight of the polyamide-epihalohydrin resin and the glyoxalated polyacrylamide resin.

41. The resin composition, fiber product, or method according to any one of paragraphs 35 to 40, wherein the resin composition comprises about 25 wt % to about 75 wt % of the polyamide-epihalohydrin resin, based on a combined solids weight of the polyamide-epihalohydrin resin and the glyoxalated polyacrylamide resin.

42. The resin composition, fiber product, or method according to any one of paragraphs 35 to 41, wherein the resin composition comprises about 45 wt % to about 55 wt % of the polyamide-epihalohydrin resin, based on a combined solids weight of the polyamide-epihalohydrin resin and the glyoxalated polyacrylamide resin.

43. The resin composition, fiber product, or method according to any one of paragraphs 35 to 42, wherein the resin composition has an initial viscosity at a time the resin composition is prepared, wherein about 5 minutes after the resin composition is prepared the resin composition has a second viscosity that is at least 30% greater than the initial viscosity, and wherein the resin composition is maintained at a temperature of about 25° C. from the time the resin composition is prepared until the second viscosity is measured.

44. The resin composition, fiber product, or method according to any one of paragraphs 35 to 43, wherein the resin composition has an initial viscosity at a time the resin composition is prepared, wherein about 20 minutes after the resin composition is prepared the resin composition has a second viscosity that is at least 80% greater than the initial viscosity, and wherein the resin composition is maintained at a temperature of about 25° C. from the time the resin composition is prepared until the second viscosity is measured.

45. The resin composition, fiber product, or method according to any one of paragraphs 35 to 44, wherein the resin composition has an initial viscosity at a time the resin composition is prepared, wherein about 5 minutes after the resin composition is prepared the resin composition has a second viscosity that is at least 90% greater than the initial viscosity, and wherein the resin composition is maintained at a temperature of about 25° C. from the time the resin composition is prepared until the second viscosity is measured.

46. The resin composition, fiber product, or method according to any one of paragraphs 35 to 45, wherein the resin composition has an initial viscosity at a time the resin composition is prepared, wherein about 20 minutes after the resin composition is prepared the resin composition has a second viscosity that is at least 250% greater than the initial viscosity, and wherein the resin composition is maintained at a temperature of about 25° C. from the time the resin composition is prepared until the second viscosity is measured.

47. The resin composition, fiber product, or method according to any one of paragraphs 35 to 46, wherein the polyamide-epihalohydrin resin has a charge density of about 1 mEq/g of solids to about 4 mEq/g of solids.

48. The resin composition, fiber product, or method according to any one of paragraphs 35 to 47, wherein the azetidinium ions are formed by reacting an epihalohydrin and the polyamine partially crosslinked with the bridging moiety, and wherein the epihalohydrin comprises epichlorohydrin, epibromohydrin, epiiodohydrin, or any mixture thereof.

49. The resin composition, fiber product, or method according to any one of paragraphs 35 to 48, wherein the polyamine has a chemical formula:

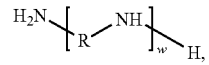

wherein R is a substituted or unsubstituted organic diyl group, and wherein w is an integer of 1 to about 10,000.

50. The resin composition, fiber product, or method according to any one of paragraphs 35 to 49, wherein the functionally symmetric crosslinker comprises:

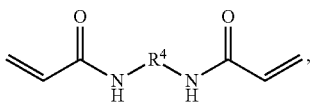

wherein $R^4$ is $(CH_2)_d$, wherein d is 1, 2, or 3.

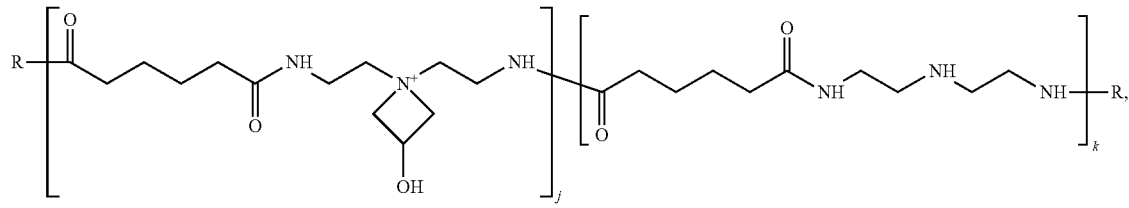

51. The resin composition, fiber product, or method according to any one of paragraphs 35 to 50, wherein the functionally symmetric crosslinker comprises:

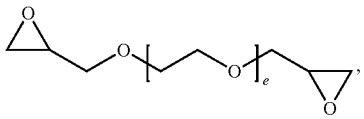

wherein e is from about 1 to about 100.

52. The resin composition, fiber product, or method according to any one of paragraphs 35 to 51, wherein the functionally symmetric crosslinker comprises:

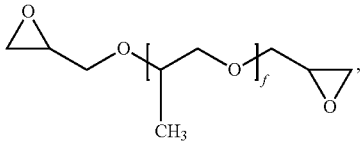

wherein f is from about 1 to about 100.

53. The resin composition, fiber product, or method according to any one of paragraphs 35 to 52, wherein the functionally symmetric crosslinker comprises:

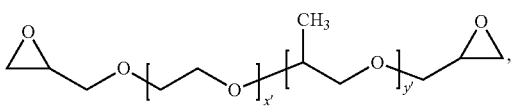

wherein x'+y' is from about 1 to about 100.

54. The resin composition, fiber product, or method according to any one of paragraphs 35 to 53, wherein the functionally symmetric crosslinker comprises:

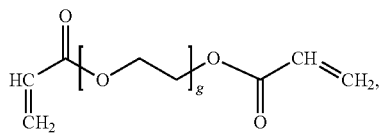

wherein g is from about 1 to about 100.

55. The resin composition, fiber product, or method according to any one of paragraphs 35 to 54, wherein the functionally symmetric crosslinker comprises:

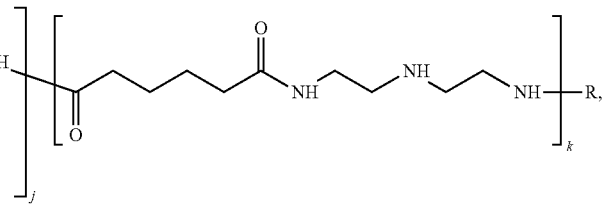

wherein a j/k ratio is from about 10 to about 1000.

56. The resin composition, fiber product, or method according to any one of paragraphs 35 to 55, wherein the functionally symmetric crosslinker comprises: a copolymer of an acrylate, a methacrylate, an alkene, or a diene, with an azetidinium-functionalized monomer selected from

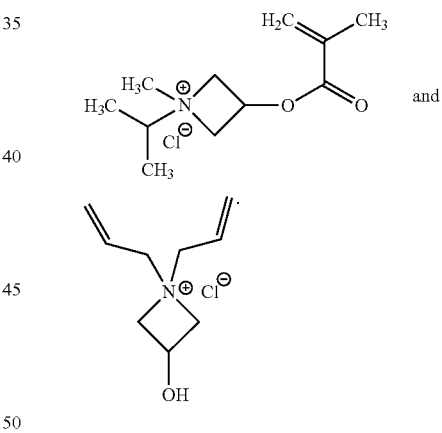

57. The resin composition, fiber product, or method according to any one of paragraphs 35 to 56, wherein the functionally symmetric crosslinker comprises a diacrylate compound, a bis(acrylamide) compound, a diepoxide compound, a polyazetidinium compound, a bis(methacrylamide) compound, a poly(alkylene glycol) diglycidyl ether compound, a dialdehyde compound, a diisocyanate compound, a 1,3-dialkyldiazetidine-2,4-dione compound, a dianhydride compound, a diacyl halide compound, a dienone compound, a dialkyl halide compound, or any mixture thereof.

58. The resin composition, fiber product, or method according to any one of paragraphs 35 to 57, wherein the glyoxalated polyacrylamide resin is prepared by a process comprising: reacting a first amount of glyoxal with a base polyacrylamide having pendant amide groups to produce a first intermediate glyoxalated polyacrylamide; adding an acid to the first intermediate glyoxalated polyacrylamide to produce a second intermediate glyoxalated polyacrylamide having a reduced pH as compared to the first intermediate glyoxalated polyacrylamide; and adding a second amount of glyoxal to the second intermediate glyoxalated polyacrylamide to produce the glyoxalated polyacrylamide.

59. The resin composition, fiber product, or method according to any one of paragraphs 35 to 58, wherein the plurality of fibers comprises cellulosic fibers.

60. The resin composition, fiber product, or method according to any one of paragraphs 35 to 59, wherein the fiber product is a paper, a tissue paper, or a paper towel.

61. The resin composition, fiber product, or method according to any one of paragraphs 35 to 60, wherein the plurality of fibers comprises at least one material selected from bleached furnish, softwood, hardwood, paper pulp, mechanical pulp, or any mixture thereof.

62. The resin composition, fiber product, or method according to any one of paragraphs 35 to 42 or 44 to 61, wherein the resin composition has an initial viscosity at a time the resin composition is prepared, wherein about 5 minutes after the resin composition is prepared the resin composition has a second viscosity that is at least 20% greater than the initial viscosity, and wherein the resin composition is maintained at a temperature of about 25° C. from the time the resin composition is prepared until the second viscosity is measured.

63. The resin composition, fiber product, or method according to any one of paragraphs 35 to 43 or 45 to 62, wherein the resin composition has an initial viscosity at a time the resin composition is prepared, wherein about 20 minutes after the resin composition is prepared the resin composition has a second viscosity that is at least 60% greater than the initial viscosity, and wherein the resin composition is maintained at a temperature of about 25° C. from the time the resin composition is prepared until the second viscosity is measured.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. An aqueous two-component resin blend comprising about 25 wt % to about 75 wt % of a glyoxalated polyacrylamide resin component and a balance of about 25 wt % to about 75 wt % of a polyamide-epihalohydrin wet strength resin component, wherein said weight percentages are based on a combined solids weight of the polyamide-epihalohydrin wet strength resin component and the glyoxalated polyacrylamide resin component; wherein the polyamide-epihalohydrin wet strength resin component has azetidinium ions and comprises a polyamine partially crosslinked with a bridging moiety derived from a functionally symmetric crosslinker; and wherein the aqueous two-component resin blend has a solids content of about 15 wt % to about 25 wt %.

2. The aqueous two-component resin blend of claim 1, wherein the aqueous two-component resin blend has a solids content of about 20 wt % to about 25 wt %.

3. The aqueous two-component resin blend of claim 1, comprising about 30 wt % to about 70 wt % of the glyoxalated polyacrylamide resin component and a balance of about 30 wt % to about 70 wt % of the polyamide-epihalohydrin wet strength resin component, wherein said weight percentages are based on the combined solids weight of the polyamide-epihalohydrin wet strength resin component and the glyoxalated polyacrylamide resin component.

4. The aqueous two-component resin blend of claim 1, wherein the aqueous two-component resin blend has an initial viscosity at a time the aqueous two-component resin blend is prepared, wherein about 5 minutes after the aqueous two-component resin blend is prepared the aqueous two-component resin blend has a second viscosity that is at least 20% greater than the initial viscosity, and wherein the aqueous two-component resin blend is maintained at a temperature of about 25° C. from the time the aqueous two-component resin blend is prepared until the second viscosity is measured.

5. The aqueous two-component resin blend of claim 1, wherein the aqueous two-component resin blend has an initial viscosity at a time the aqueous two-component resin blend is prepared, wherein about 20 minutes after the aqueous two-component resin blend is prepared the aqueous two-component resin blend has a second viscosity that is at least 60% greater than the initial viscosity, and wherein the aqueous two-component resin blend is maintained at a temperature of about 25° C. from the time the aqueous two-component resin blend is prepared until the second viscosity is measured.

6. The aqueous two-component resin blend of claim 1, wherein the polyamide-epihalohydrin wet strength resin component has an azet ratio of at least 0.7 to 1.0.

7. The aqueous two-component resin blend of claim 1, wherein the azetidinium ions are formed by reacting an epihalohydrin and the polyamine partially crosslinked with the bridging moiety, and wherein the epihalohydrin comprises epichlorohydrin, epibromohydrin, epiiodohydrin, or any mixture thereof.

8. The aqueous two-component resin blend of claim 1, wherein the polyamine has a chemical formula:

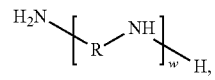

wherein R is a substituted or unsubstituted organic diyl group, and wherein w is an integer of 1 to about 10,000.

9. The aqueous two-component resin blend of claim 1, wherein the functionally symmetric crosslinker comprises:

51

[structure: N,N'-bis(acryloyl) compound with R⁴ linker]

wherein R⁴ is (CH₂)$_d$, wherein d is 1, 2, or 3;

[structure: diglycidyl ether of poly(ethylene glycol)]

wherein e is from about 1 to about 100;

[structure: diglycidyl ether of poly(propylene glycol)]

wherein f is from about 1 to about 100;

[structure: diglycidyl ether of poly(ethylene-co-propylene glycol)]

wherein x'+y' is from about 1 to about 100;

[structure: poly(ethylene glycol) diacrylate]

wherein g is from about 1 to about 100;

[polymer structure with azetidinium and polyamine repeating units]

wherein a j/k ratio is from about 10 to about 1000;

a copolymer of an acrylate, a methacrylate, an alkene, or a diene, with an azetidinium-functionalized monomer selected from

52

[structure: methacrylate-functional azetidinium chloride]

and

[structure: diallyl-azetidinium chloride with OH]

or any mixture thereof.

10. The aqueous two-component resin blend of claim 1, wherein the functionally symmetric crosslinker comprises a diacrylate compound, a bis(acrylamide) compound, a diepoxide compound, a polyazetidinium compound, a bis(methacrylamide) compound, a poly(alkylene glycol) diglycidyl ether compound, a dialdehyde compound, a diisocyanate compound, a 1,3-dialkyldiazetidine-2,4-dione compound, a dianhydride compound, a diacyl halide compound, a dienone compound, a dialkyl halide compound, or any mixture thereof.

11. The aqueous two-component resin blend of claim 10, wherein the glyoxalated polyacrylamide resin component is prepared by:
reacting a first amount of glyoxal with a base polyacrylamide having pendant amide groups to produce a first intermediate glyoxalated polyacrylamide;
adding an acid to the first intermediate glyoxalated polyacrylamide to produce a second intermediate glyoxalated polyacrylamide having a reduced pH as compared to the first intermediate glyoxalated polyacrylamide; and
adding a second amount of glyoxal to the second intermediate glyoxalated polyacrylamide to produce the glyoxalated polyacrylamide resin component.

12. The aqueous two-component resin blend of claim 1, wherein the glyoxalated polyacrylamide resin component is prepared by:
reacting a first amount of glyoxal with a base polyacrylamide having pendant amide groups to produce a first intermediate glyoxalated polyacrylamide; adding an acid to the first intermediate glyoxalated polyacrylamide to produce a second intermediate glyoxalated polyacrylamide having a reduced pH as compared to the first intermediate glyoxalated polyacrylamide; and adding a second amount of glyoxal to the second intermediate glyoxalated polyacrylamide to produce the glyoxalated polyacrylamide resin component.

13. The aqueous two-component resin blend of claim 1, comprising about 50 wt % of the glyoxalated polyacrylamide resin component and a balance of about 50 wt % of the polyamide-epihalohydrin wet strength resin component, wherein said weight percentages are based on the combined solids weight of the polyamide-epihalohydrin wet strength resin component and the glyoxalated polyacrylamide resin component.

14. The aqueous two-component resin blend of claim 1, comprising about 30 wt % to about 70 wt % of the glyoxalated polyacrylamide resin component and a balance of about 30 wt % to about 70 wt % of the polyamide-epihalohydrin wet strength resin component, wherein said weight percentages are based on the combined solids weight of the polyamide-epihalohydrin wet strength resin component and the glyoxalated polyacrylamide resin component; and the aqueous two-component resin blend has a solids content of about 20 wt % to about 25 wt %.

15. The aqueous two-component resin blend of claim 1, comprising about 30 wt % to about 70 wt % of the glyoxalated polyacrylamide resin component and a balance of about 30 wt % to about 70 wt % of the polyamide-epihalohydrin wet strength resin component, wherein said weight percentages are based on the combined solids weight of the polyamide-epihalohydrin wet strength resin component and the glyoxalated polyacrylamide resin component; wherein the aqueous two-component resin blend has a solids content of about 20 wt % to about 25 wt %; and
wherein the glyoxalated polyacrylamide resin component is prepared by:
reacting a first amount of glyoxal with a base polyacrylamide having pendant amide groups to produce a first intermediate glyoxalated polyacrylamide;
adding an acid to the first intermediate glyoxalated polyacrylamide to produce a second intermediate glyoxalated polyacrylamide having a reduced pH as compared to the first intermediate glyoxalated polyacrylamide; and
adding a second amount of glyoxal to the second intermediate glyoxalated polyacrylamide to produce the glyoxalated polyacrylamide resin component.

16. A method for making a fiber product, comprising: combining the aqueous two-component resin blend of claim 1 with a plurality of fibers to produce a mixture; and
at least partially curing the aqueous two-component resin blend to produce a fiber product.

17. The method of claim 16, wherein the aqueous two-component resin blend has a solids content of about 20 wt % to about 25 wt %.

18. The method of claim 16, wherein the functionally symmetric crosslinker comprises a diacrylate compound, a bis(acrylamide) compound, a diepoxide compound, a polyazetidinium compound, a bis(methacrylamide) compound, a poly(alkylene glycol) diglycidyl ether compound, a dialdehyde compound, a diisocyanate compound, a 1,3-dialkyldiazetidine-2,4-dione compound, a dianhydride compound, a diacyl halide compound, a dienone compound, a dialkyl halide compound, or any mixture thereof.

19. The method of claim 16, wherein the plurality of fibers comprises at least one material selected from bleached furnish, softwood, hardwood, paper pulp, mechanical pulp, or any mixture thereof.

20. The method of claim 16, wherein the plurality of fibers comprises cellulosic fibers.

* * * * *